US006557075B1

(12) United States Patent
Maher

(10) Patent No.: US 6,557,075 B1
(45) Date of Patent: Apr. 29, 2003

(54) MAXIMIZING THROUGHPUT IN A PAIRWISE-REDUNDANT STORAGE SYSTEM

(76) Inventor: Andrew Maher, 105 North Rd., Eastchester, NY (US) 10709

( * ) Notice: Subject to any disclaimer, the term of this patent is extended or adjusted under 35 U.S.C. 154(b) by 206 days.

(21) Appl. No.: 09/652,436

(22) Filed: Aug. 31, 2000

Related U.S. Application Data

(60) Provisional application No. 60/151,633, filed on Aug. 31, 1999.

(51) Int. Cl.[7] .............................................. G06F 12/00
(52) U.S. Cl. .......................... 711/113; 711/114; 711/137
(58) Field of Search ...................... 711/5, 111, 112–114, 711/204, 213, 119–121, 137

(56) References Cited

U.S. PATENT DOCUMENTS

| 5,742,792 A | * | 4/1998 | Yanai et al. ................... 710/1 |
| 5,787,463 A |   | 7/1998 | Gajjar ......................... 711/114 |
| 5,809,560 A | * | 9/1998 | Schneider ................... 711/202 |

* cited by examiner

*Primary Examiner*—Matthew Kim
*Assistant Examiner*—Woo H. Choi
(74) *Attorney, Agent, or Firm*—Elman Technology Law, P.C.; Gerry J. Elman

(57) ABSTRACT

The present invention provides an important improvement to memory subsystems that use redundant arrays of inexpensive disks (RAID), especially those configured in compliance with the RAID-1 standard. The cache management subsystem, together with a second externally addressable device interface and the communications software necessary for the support thereof, allow for the attached computer systems to access the two disks of the RAID-1 subsystem as if they were a single disk unit having two discrete head-and-data assemblies (HDA), a/k/a "disk arms". Known technologies maintain the mirroring of the two discrete disk volumes. The present invention adds unique extensions to those technologies to allow the external representation as a single, multi-HDA device. This segregation of HDA function enables greater throughput and fewer delays to the devices while being driven under a mix of random and sequential processing typical of concurrent DSS (decision support), backup, and transaction oriented workflow.

21 Claims, 13 Drawing Sheets

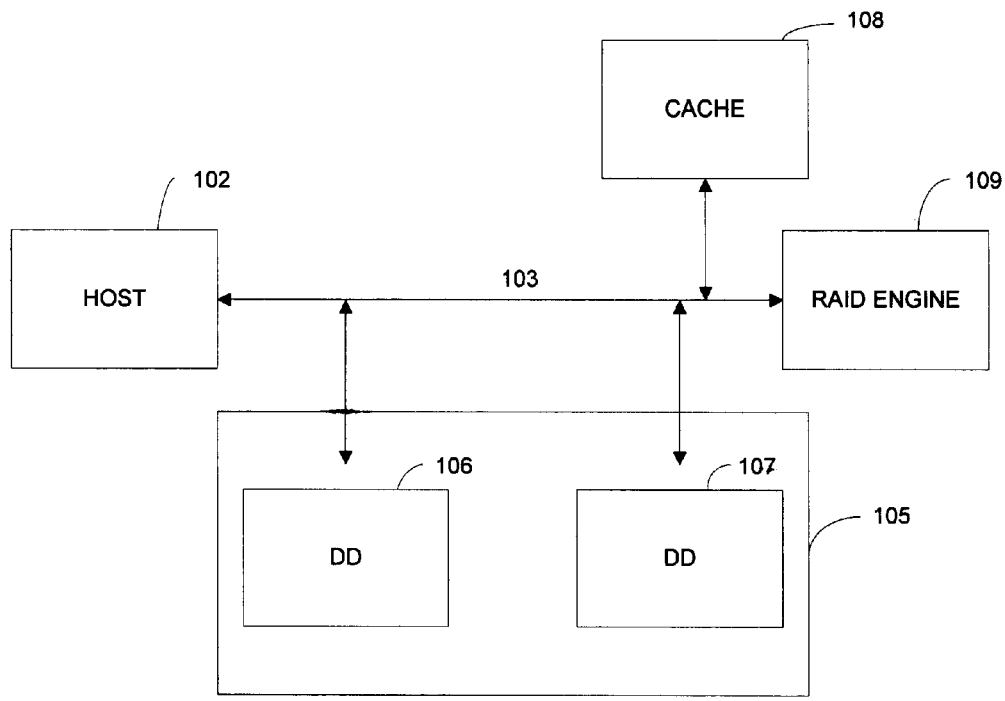
FIG. 1 - Prior Art
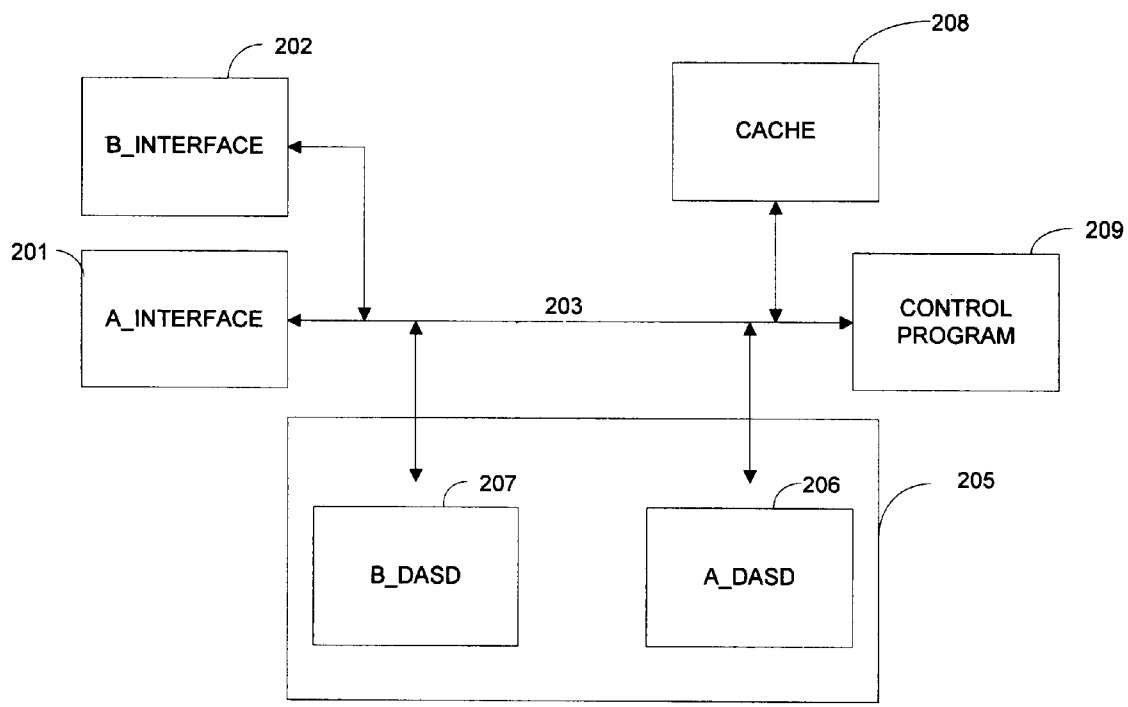
FIG. 2

MAXIMIZING THROUGHPUT IN A PAIRWISE-REDUNDANT STORAGE SYSTEM

CROSS REFERENCE TO RELATED APPLICATIONS

This application claims priority under 35 U.S.C. 119(e) from U.S. Provisional Application No. 60/151,633, filed Aug. 31, 1999.

BACKGROUND OF THE INVENTION

1. Field of the Invention

The invention relates generally to data storage systems associated with computer systems and, in particular, to a method and system for improving the transfer of data to and from a storage system that has been configured to act as a RAID-1 system by storing two sets of duplicated data and which uses application-specific input/output characteristics.

2. Description of the Related Art

During the last decade, the amount of data to be processed, stored and accessed by certain industries, such as banks, financial and insurance institutions, automobile manufacturers and airlines as everyday, normal business operations, in particular the number of data accessing requests, have exploded. These vastly increased data processing needs have spurred the creation of new systems for storing and accessing data, for example, Redundant Arrays of Inexpensive Disks (RAID) and Storage Area Networks (SAN), as well as the development of faster computer-to-storage device interface technology and protocol standards, such as Fibre Channel standards and Small Computer System Interface (SCSI) by which to improve the rate of data transfer, i.e., data throughput.

Also accompanying this explosion in data processing needs has been a concomitant increase in the number of patents related to improving the performance of storing and accessing data using the new storage system technologies. For example, a simple search for United States patents shows that there have been at least 50 patents this year alone that relate to arrayed memory in a computer. For example, U.S. Pat. No. 6,076,143 to Blumenau which discloses a method that manages the writing of data blocks to be accessed on a disc drive storage system whereby a data block is written to one disc at a different physical sector address than the address to which the same data block is written to on a redundant disc. Also, U.S. Pat. No. 5,974,502 to DeKoning et al. provides a method for improving throughput between the host computer and an array of disk drives by splitting up large I/O requests from the computer into smaller, more manageable pieces and processing these requests as if they were individual I/O requests. Further, U.S. Pat. No. 5,787,463 to Gajjar introduces a dual-ported staging memory between the RAID engine and the host bus so that both the host and the RAID engine can concurrently access such stage memory, thereby allowing asynchronous memory operation.

These patents seek to improve data transfer or throughput in a disc drive storage system largely by focusing on upgrading the performance, sequencing, or timing of the storage hardware. However, there is also another approach to improving data throughput, by taking into consideration the kinds of data accessed, the kinds of application software used to input the data as well as the kinds of data requests processed. These are especially important considerations in the industries named above, inasmuch as in these and many other industrial contexts, data is processed in two very different yet predictable ways: first, decision support system processing and second, transaction processing.

The conflicting behaviors of Transaction Processing (TP) Applications and Decision Support System Applications (DSS) have caused the replication of data to flourish and created huge costs and latencies in order to speed up the storing and accessing of data. For example, users of the DSS Applications in a banking context are usually requesting either reports or performing complex arithmetic operations that involve reading out from storage disks a long and huge stream of data, which typically requires the disk head to move sequentially around the platter from sector to sector that are more or less adjacent to each other. On the other hand, users of the TS Applications are usually writing in or requesting short blocks of data that are not written in or read out sequentially but are stored or accessed across platter tracks in a manner that typically requires the disk head to "skip" all over the platter.

Conflicts inevitably arise when one disk head is called upon both to read out long streams of sequentially-stored data and to read and write short bursts of non-sequentially-stored data. In short, in responding to requests for processing from both a TP software and a DSS software, the disk heads will be working at cross purposes, which implicates that the physical data path from disk to storage cannot be shared for processing requests from these two kinds of software.

Because DSS software typically read data sequentially, TP software generally does not allow real time access to the DSS system, in order not to negatively impact business performance. Due to the disparity between how DSS applications and TP applications are stored and accessed, users in the data warehouse, datamart and data mining lines of a business, those who typically use the DSS software have had to create copies of the "real-time" data in order to crunch or report on them. This need to duplicate data within an enterprise in order to have them available for different processing needs has in turn created a massive sub-industry of copy management as well as fostered data bandwidth and CPU capacity obstacles.

To solve the problems inherent in required data duplication due to different processing needs, an enterprise can rely on a storage system that either has two sets of disk heads or that has been configured to operate as if there are two sets of disk heads. A storage system that stores duplicate data is a RAID-1 engine, which is an array of paired storage devices. A storage system that does not actually comprise a RAID-1 engine may nevertheless be configured to store duplicate sets of mirrored data and so operate as if it were a RAID-1 configuration.

SUMMARY OF THE INVENTION

The present invention provides a method of accessing and storing data in a memory system communicating with one or more computers generating read and write requests. The memory system comprises a controller, a memory cache for temporarily storing data. The memory cache comprises an A-cache and a B-cache, and a pairwise-redundant direct access storage device comprising an A-DASD and a B-DASD. The B-cache is a read-ahead cache of data read from B-DASD.

One embodiment of a method of the present invention comprises the steps of providing an A-interface and a B-interface to the memory system, configuring transaction processing applications on a computer communicating with the, memory system to direct read and write requests to the A-interface, configuring decision support system applications on a computer communicating with the memory system to direct read and write requests to the B-interface, fulfilling write requests received at the A-interface by writing data to-the A-cache, fulfilling write requests received at the B-interface by writing data to the A-cache.

The method also comprises the steps of fulfilling read requests received at the A-interface by reading data from the A-cache whenever it contains the requested data or else reading data from the A-DASD, fulfilling read requests received at the B-interface by reading data from the B-cache whenever it contains the requested data or else reading data from the B-DASD, writing data, not yet been committed to A-DASD, from the A-cache to the A-DASD whenever the A-DASD is not fulfilling a read request, and writing data that has not yet been committed to B-DASD, from the A-cache to the B-DASD whenever the B-DASD is not fulfilling a read request. The average time for fulfilling read requests is improved over that of a corresponding memory system using a RAID-1 controller.

Another embodiment of a method of the present invention further comprises the steps of interrupting, whenever A-cache becomes full, the flow of data at A-interface and B-interface, including any read operation from B-DASD, writing to B-DASD records in A-cache that are changed but not yet committed to B-DASD, in the preferential sequence of those records which are logically in read sequence before the current reading position of B-DASD, and then, if additional records must be written in order to generate sufficient space in A-cache, and those records which are logically in read sequence after the reading position of B-DASD and are most distant from the current reading position of B-DASD, such that space in A-cache has been freed. This embodiment then allows the flow of data at A-interface and B-interface to resume, including any interrupted read operation from B-DASD. The likelihood is thereby minimized that the data read from B-DASD in a resumed read operation was changed from the corresponding data before the write operation to B-DASD records in A-cache was performed.

A further embodiment of the method comprises either of the above embodiments wherein A-cache contains the records in the memory cache that have been generated from input from A-interface and the records that have been read from A-DASD and wherein B-cache contains the records in the memory cache that have been read from B-DASD.

The present invention also provides a data structure for an A-cache in a memory system that comprises a pairwise-redundant direct access storage device having an A-DASD and a B-DASD. The data structure comprises a plurality of records in a rapidly accessible cache memory. Each record comprises an entry comprising one or more fields, which correspond to an address on the direct access storage device, a flag indicating whether the record in the memory cache has been changed by new input since being committed to A-DASD or B-DASD, a flag indicating whether the record has been committed to A-DASD, a flag indicating whether the record has been committed to B-DASD, and a data field.

The present invention also provides an improvement to a memory system that communicates with one or more computers, which generate read and write requests. The memory system comprises a controller, a memory cache for temporarily storing data, and a mirroring direct access storage device comprising an A-DASD and a B-DASD. The improvement comprises an A-interface receiving read and write requests generated by transaction processing software running on a computer, a B-interface receiving read and write requests generated by decision support software running on a computer, the B-interface being configured to send write requests to the A-interface, an A-cache, to which is sent all read and write requests received by the A-interface, a B-cache, to which is sent all read requests received by the B-interface, and a controller programmed to cause the changed contents of the A-cache to be written to the A-DASD when the A-DASD is not being read from and to be written to the B-DASD when the B-DASD is not being read from. The average time for fulfilling read requests is improved over that of a corresponding memory system using a RAID-1 controller.

The present invention provides another embodiment of the above improvement to a memory system, wherein the controller is also programmed to interrupt the flow of data from the A-interface and write to the B-DASD when the A-cache is full. The present invention provides a still further embodiment of the previous improvement, wherein the controller is programmed to write to the B-DASD in a sequence that minimizes the likelihood that an interrupted long sequential read being performed on B-DASD will, when resumed, read data that was changed during the write that was programmed.

The present invention provides an improved RAID-1 controller for an A-DASD and a B-DASD that also comprises programming resident in the memory of the controller. The programming provides for an A-interface and a B-interface at which read and write requests may be received and executed. The programming directs write requests received at the B-interface to the A-interface, operates an A-cache that receives data from the A-interface which is requested to be written to storage and causes the data to be written immediately to the A-DASD when not otherwise occupied and, to the extent permitted by the availability of cache memory, avoids writing to the B-DASD until completion of a long sequential read therefrom. The A-interface is thereby optimized to process read and write requests for shorter blocks of data and the B-interface is optimized to process read requests for relatively longer blocks of data.

Another embodiment of the present invention of a RAID-1 controller provides that the controller operates the A-cache so as to comprise a plurality of records which indicate whether or not the data in each such record has been committed to A-DASD and whether or not the data in each such record has been committed to B-DASD.

The present invention provides a computer system having a data storage system with improved throughput, wherein a read request from decision support application software generally accesses a long sequence of data blocks and a read or write request from transaction processing application software generally accesses non-sequentially read or written data blocks. The system comprises a host computer, a storage subsystem to which data blocks are transferred to and from the host computer. The storage subsystem comprises a storage device, a memory cache for temporarily storing data blocks being transferred between the host computer and the storage device, a pairwise-redundant disk configuration of the storage device whereby the configuration provides for creating a redundant pair of data sets. The industry-standard protocols are used for interfacing the storage subsystem with the host computer.

The storage subsystem also comprises a controller for the storage device that configures the storage device whereby a data block is stored twice, into a first and a second of a pair of storage sets for the purpose of storing the data in a pairwise-redundant manner, stores data from non-sequentially written data blocks into the first storage set while and as responding to a processing command from a decision support system software to read out sequentially-read data blocks and stores data from non-sequentially written data blocks into the memory cache while and as responding to a read command from the decision support system software to read out sequentially-read data blocks, so long as the storage capacity of the memory cache has not been reached. Further, so long as the storage capacity of the memory cache has not been reached, the storage subsystem transfers the set of data blocks stored therein into the second storage set upon completion of processing a read request from decision support system software to read out sequentially-read data blocks. When the storage capacity of the memory cache has been reached, the storage system interrupts the processing of a read request from decision support system application software to read out sequentially-read data blocks by transferring the set of data blocks stored in cache memory into the second storage set.

Alternate embodiments of a computer system of the present invention use industry standard protocols that may comprise Fibre Channel standards, SCSI standards, IDE/ATA standards, and PCI standards.

An alternate embodiment of the system comprises a plurality of storage devices and a storage device controller that further configures an even number of storage devices so that there are discrete pairs of storage devices whereon the same sets of data blocks are stored twice, as a first storage set and a second storage set in a pair, creating pairwise-redundant sets of data. The controller stores a set of nno-sequentially written data blocks into the first storage set while and as responding to a processing command from decision support system application software to read out sequentially-read data blocks. So long as cache memory has not been exceeded, the controller transfers the set of data blocks stored therein into the second storage device upon completion of processing a request from decision support system application software to read out sequentially-read data blocks. When cache memory is full, the controller interrupts the processing of a request from decision support system application software to read out sequentially-read data blocks by transferring the set of data blocks from cache memory into the second storage device.

An alternate embodiment of the system comprises storage devices that include at least one pair of RAID disk drives, a pair of storage devices within a storage area network, or pair of CD-ROMs. An alternate embodiment of the system comprises a storage device controller that uses industry standard protocols comprising Fibre Channel standards, SCSI standards, IDE/ATA standards, PCI standards, or Internet Protocol standards.

The present invention also provides a machine readable medium containing executable code, which optimizes the read-write throughput of a programmed general purpose computer comprising a memory system of the present invention by directing write requests and non-sequential read requests to the A-interface and which directs sequential read requests to the B-interface.

DETAILED DESCRIPTION OF THE DRAWINGS

FIG. 1 shows a block diagram of a prior art RAID system.

FIG. 2 shows a block diagram of a system of the present invention.

FIG. 10 is a flow chart depicting the steps of a method of the present invention when a Read Command is sent through the B-interface and consists of four folios:

DETAILED DESCRIPTION

Definitions

Figure 3:
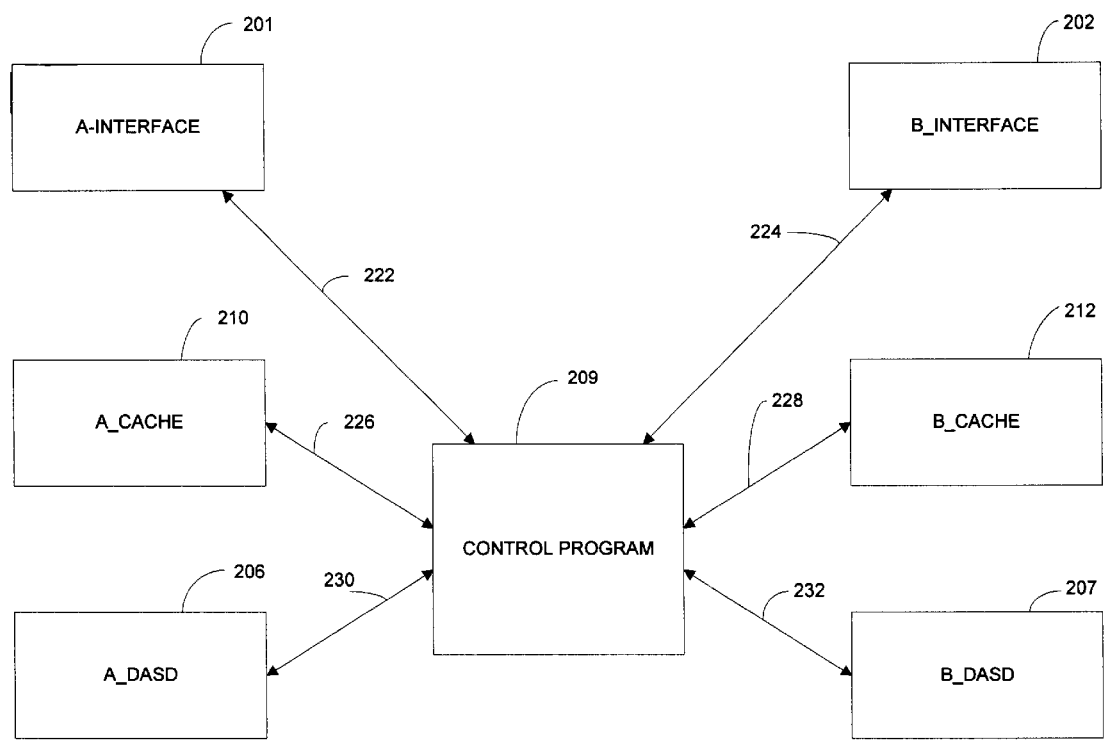
FIG. 3 shows a block diagram displaying the flow of control exercised by a method of the present invention over various devices in the system of the present invention.

Decision Support System. As used most narrowly herein, a Decision Support System (DSS) is a computer-based system intended to help managers make decisions. A DDS helps a manager retrieve, summarize and analyze decision-relevant data. A DDS may be data-oriented, model-oriented or may support variously a large group of managers in a networked, client-server environment with a specialized data warehouse or a single user on a PC in a manager's office. As used more broadly herein, and in the claims of this patent, a "decision support system application" is characterized by generating read requests for long sequential blocks of data, and any application program or module thereof having this characteristic is intended to be embraced by this term.

Transaction Processing. As used most narrowly herein, a Transaction Processing system is a system that records and tracks the scheduling, assignment and execution of the flow of goods and/or services and money to satisfy a specific business objective. A typical Transaction Processing system is a customer control information system, which includes Point of Sale systems (POS), Order-Entry systems, Distribution and Logistics systems, Purchasing and Receiving systems and Reservation systems. As used more broadly herein and in the claims of this patent, a "transaction processing system application" is characterized by relatively short and frequent read and write requests.

Data Mining. As used herein, the extraction of patterns of interest from a database,. repository or warehouse typically done by a class of analytical applications that sift through large amounts of data to produce data content relationships.

Data Warehouse. As used herein, data warehouse refers to a database of.information intended for use as part of a decision support system. The data are typically extracted from an organization's operational databases.

The present invention provides a method and system for controlling read/write requests of data stored in a pairwise-redundant array, e.g. a RAID-1 configuration, which improves the typical throughput of data transfer and-reduces the typical latency in data access of such systems by controlling for the manner of storage and access of data when using Transaction Processing software and Decision Support software simultaneously. The present invention provides a software program that directs the way the control program for a storage subsystem comprising a RAID-1 configuration of paired, redundant storage arrays transfers and stores data obtained from different kinds of application software. In effect, the present invention acts as a "data traffic controller" to "schedule" asynchronous write in and read out of data to paired, redundant storage devices, which scheduling maximizes throughput between the storage devices and one or more host computers.

In a nutshell, a preferred method of the present invention configures the storage system as a pairwise-redundant RAID-1 configuration (whereby redundant sets of stored data "mirror" each other) but schedules the mirroring to be performed asynchronously in order to improve throughput of data transfer. Specifically, the method of the present invention does not direct the simultaneous updating of the data records of the one of the paired storage arrays relative to those of the other during long, sequential reads. When updating must occur during such a long readout to free up needed cache space, the method of the present invention desirably positions the disk heads to update the storage device so that their movement around the platter is minimized. By so doing, the method of the present invention more efficiently performs the operation of updating pairwise-redundant storage arrays and thereby maximizes throughput of data through the data channel. In effect, the method of the present invention staggers the mirroring of the paired storage array to more efficiently perform data transfer, thereby maximizing throughput and reducing data latency relative to those of a typical RAID-1 configuration.

Pattern and Control of Data Access/Storage using various Software Applications

Transaction Processing Applications

The pattern of data access and storage of a Transaction Processing system is more than likely random. A kind of Transaction Processing system is a customer control information system, which may include Point of Sale system (POS), Order-Entry system, Distribution and Logistics system, Purchasing and Receiving system, Reservation system or General Accounting systems. For example, when a call center, a customer service center, an Automatic Teller Machine or a Point of Supply terminal submits data to be stored regarding a transaction, it is unlikely that numbers relating to a particular customer transaction will be acquired in a strictly sequential numerical order, which thereby encourages storage and access in a random pattern on the disk platter. In storing data received from a Transaction Processing application, the disk heads of the storage device will be figuratively dancing as they skip from track to track in the platter in a non-sequential pattern to retrieve or store data.

Some control of the disk heads may be achieved by proper database design. If the transaction processing database is well-designed, the movement of the disk heads will be confined to within a small circle of tracks around the middle of the platters. If the database is poorly designed, or if the transactions contain non-sequentially-ordered data, the disk heads will dart backwards and forwards across the platter wildly. Thus, a typical Transaction Processing application does not control the operation of the disk heads so that they read or write data from the platter sequentially or, more to the point, efficiently. A Transaction Processing system generally does not tag the requested data records with certain fields so as to create ordered data blocks in order to bring about a more efficient way for the disk heads to read out or write in the requested data records.

Decision Support Systems

A well-designed Decision Support System application will typically transfer data so that the disk heads of the storage device will be directed to read out data more or less sequentially. Even though the disk head may be directed to skip some sectors, the disk head will skip these in its proper collating sequence. Decision Support System applications may control how data are read; they do not control how data are written. Thus, for a write-in request from a Decision Support System application, the system of the present invention allows the disk heads to behave as if the request originated from a Transaction Processing application. However, because preferred embodiments of the present invention can keep track of the position of the disk head during read out requests, in fulfilling a-read request from a Decision Support System application, long records of sequentially stored data are read out, which means that the disk heads are not darting to locations back and forth around the platter but moving from one sector to the next.

Theoretical Requirements for Sharing Storage and Access of Transaction Processing Data and Decision Support System Data Within One Storage System The method of the present invention utilizes this predictability about where the disk heads are and how they operate during a read-out request from a Decision Support System application so as to more efficiently direct the movement of the disk heads to write in updated data as write requests come in from Transaction Processing applications. Moreover, the present method relies on knowledge about how the disk heads perform read and write requests from different application software in order to "schedule" write requests to one of the paired storage arrays in a RAID-1 configuration. "Scheduling" write requests to one of the paired storage arrays means that the paired arrays do not mirror each other at all times but that data updating for one array is asymmetrically performed relative to the other storage array. By allowing slight lags in the mirroring of the paired arrays in a RAID-1 or other paired configuration, the present invention takes advantage of efficiencies in disk head movement to increase the data transfer rate and reduce latency.

Because of the fundamentally contradictory way that data are stored and accessed for Transaction Processing software versus the way data are accessed for Decision Support System software, it would be theoretically desirable to provide a disk drive with two independent sets of disk heads—one exclusively for reading in and writing out data transferred from the Transaction Processing applications, and the other exclusively for reading out data to a Decision Support System application. Such a theoretical disk drive would possess the following features:

1. One set of disk heads is dedicated to the Transaction Processing system. It does all of the writing-in of updated records from both applications onto the storage devices as well as reads out data only to the Transaction Processing system.
2. The other set of heads is dedicated solely to the Decision Support System, used only for reading out data to that system.
3. There is one cache shared by both sets of disk drives.
4. The long, sequential records that form the data blocks read out by the Decision Support System set of disk heads would NEVER be kept in cache after being set to the interface. This is because those records will not be read out again for a long time, if at all, and the Transaction Processing system will virtually never need those data records.
5. Data that are read out and written in by the Transaction Processing dedicated heads would always be cached.
6. The cache is interrogated for reading out by either set of heads.

While such a theoretical disk drive does not exist, a RAID-1 storage device may be configured to operate as if it possessed the above features. In a typical RAID-1 array, the two disk heads of the paired disk drives march in lock step, each backing up the action of the other in order to produce mirrored sets of stored data almost simultaneously. The present invention mimics a RAID-1 array but changes the manner in which the mirroring or updating of cached data occurs. In essence, this change in mirroring redundant data records occurs this way: A set of data coming from a Transaction Processing application is first stored in a cache in order to allow a long, slow read out request from a Decision Support System application to be fulfilled without updating the data block that was originally requested to be written to.

It is a valuable feature of the present invention that either a RAID-1 array of storage devices or a storage device that may be configured to act as a RAID-1 array may be used. Ultimately, all that is required to create the appearance to the host computer of a "one storage device with two sets of disk heads" system is that the storage system present to the host computer two separate "addresses" for the cache memory that will contain mirrored data sets. It is therefore a critical aspect of the present invention that the control program of a RAID-1 configured array of storage devices provide cache memory with two separate "addresses" to which the data shall have been committed, i.e. written, because writing in of updated records from cache to the paired storage devices is not done simultaneously. Rather, the present invention allows the writing in of updated records to one of the storage devices to lag behind that of the other device in order to preserve the continuity of long read-out requests, which thereby reduces latency of accessing data and improves the throughput of writing in of updated data.

The system of the present invention also accomplishes the "one storage device with two sets of disk heads" appearance to the host computer by utilizing separate interfaces to control data transfer from each storage device in the paired array. Further, one interface is limited to the read and write transfer of information from one kind of software application and the other interface is limited to the read transfer of information from a second kind of application. (Of course, a single application program would desirably be written, in accordance with this invention, to "storage aware," and to send long, sequential reads to a particular storage interface address but to send writes and short reads to another.) By utilizing separate interfaces[ ]and assigning them to the transfer of data from only one kind of software and by assigning different "addresses" to data records in the memory cache before the records are committed to the paired storage devices, a method of the present invention causes a host computer to view a storage system of the present invention as if it comprised one storage device with two separate sets of disk heads, one set for reading data for one kind of software application and the other set for reading/writing data for a different kind of software application.

Those skilled in the art will appreciate that such a storage system of the present invention could include a variety of storage embodiments. In one embodiment, a system of the present invention will comprise a single disk drive configured to appear to contain two different disk drives. In another embodiment, the system of the present invention will comprise a typical RAID-1 array with paired disk drives. In another embodiment, the paired storage components given separate storage addresses will comprise paired Storage Area Network devices. And in a still further embodiment, the storage components assigned separate storage addresses will comprise a paired RAID-5 array.

DIFFERENCES BETWEEN RAID-1 AND THE PRESENT INVENTION

The differences between a typical RAID-1 array and a storage system of the present invention that has been configured to act as a RAID-1 array is the way the underlying storage control program 209, applying the method of the present invention, directs the storage and access of data. The present invention assigns two separate "addresses" to mirroring storage locations and then controls the transfer of data from and to these addresses by considering how a data block would be most efficiently transferred by a disk head, given the kind of application the data block is being used with. A major difference between a system of the present invention and a typical RAID-1 is that a RAID-1 controller looks like a single device with a single set of disk drives to the host controller on the SCSI bus or FibreChannel, but a device of the present invention, because of the separate storage "addresses" for the same data records in cache memory and because of the separate interfaces for discrete kinds of software applications, will appear to the host to have two sets of disk heads, in other words, to be two discrete storage devices.

FIG. 1 shows a typical RAID-1 configuration of the prior art. A RAID-1 device writes data synchronously to more than one device, for the purpose of mirroring, so that if one storage device fails, a complete copy of the data will still be available.

Host computer 102 is coupled to the system by bus 103. Attached to bus 103 is disk array 105 that houses disk storage devices 106 and 107. The bus 103 couples cache memory 108 to RAID engine 109, which represents a control program that determines the sequence of read and write operations. The cache 108 represents random access memory used as a temporary holding place for data about to be read from or written to the disk storage devices DD 106 and 107. Bi-directional arrow 103 shows the bi-directional flow of data on the bus.

In a RAID-1 array, data from the host computer 102, directed by the RAID engine 109, are first written to cache 108 and then to disk storage devices 106 and 107, so that each data record written to storage device 106 is simultaneously written or "mirrored" to storage device 107.

Present System

FIG. 2 shows a configuration of a system of the present invention. A-interface 201 is a read-write driver of the present invention. It comprises the conventions between the host computer and a Transaction Processing Application that provides the host computer the address of the storage location where the data used by a Transaction Processing application are read out from or written into. B-interface 202 is a read driver. It comprises the conventions between the host computer and a storage device, that informs the host computer of the address of the storage location where data requested by a Decision Support System application are read out from. Disk array or storage subsystem 205 maintains information in redundant data arrays somewhat as described in connection with FIG. 1.

Control program 209 causes data via A-interface 201 to be read and written to A-DASD [Direct Access Storage Device] 206. A-interface 201-never communicates data read from B-DASD 207. B-interface 202 communicates data read from B-DASD 207. Both A-interface 201 and B-interface 202 may communicate with cache 208.

Figure 4:
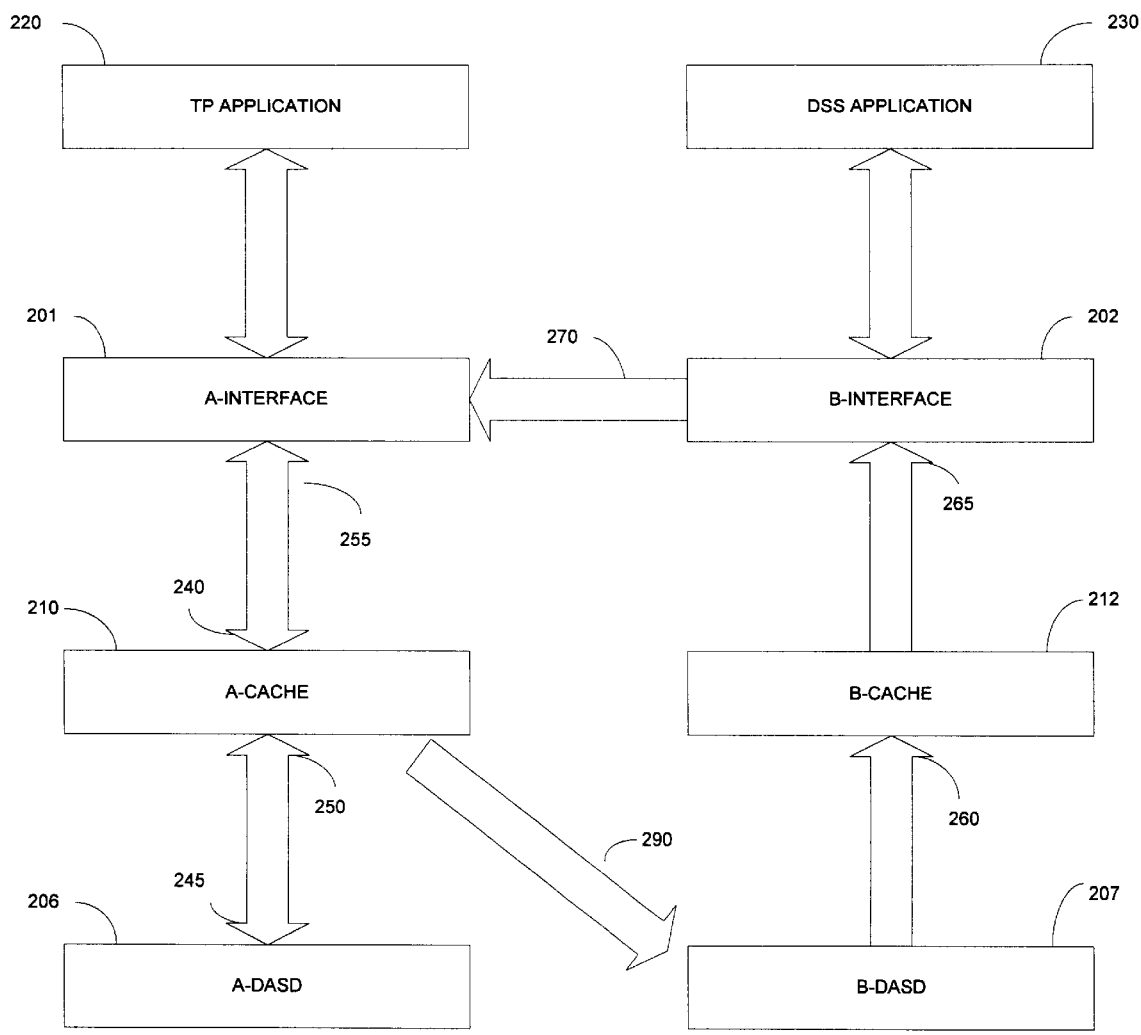
FIG. 4 shows a block diagram of the transfer of data records as controlled by a method of the present invention.

FIG. 4 shows in greater detail the possible pathways of data flow from the A-and B-interfaces. The control program 209, which contains a set of instructions for executing the method of the present invention, processes information from cache 208 and determines read out, write in status and parity information between A-DASD 206 and B-DASD 207. Bi-directional arrow 203 represents the bidirectional flow of data on the bus.

Directed by the control program 209, when writing in data received from a Transaction Processing [TP] application 220 or from a Decision Support System [DDS] 230 application, data are first directed to cache 208 and then to A-DASD 206 and B-DASD 207, so that each write to A-DASD 206 is also written or "mirrored" to B-DASD 207. Unlike the typical RAID-1 array described in FIG. 1, the "mirroring" of data is not synchronous, but asynchronous, inasmuch as the writing in of data to B-DASD 207 is scheduled to accommodate long, sequential read outs of data from B-DASD 207 and does not occur simultaneously with the writing in of the same data records to the A-DASD 206.

With continuing reference to the embodiment of FIG. 2, FIG. 3 shows the flow of control exercised by control program 209 over the various devices in the system of the present invention. The bi-directionality of arrows 222, 224, 226, 228, 230 and 232 indicates that the control program 209 both directs each of the various devices in the system as well as queries these for relevant information and decision states as needed to transfer data along the appropriate pathways as shown in FIG. 4. It is important to note that although cache 208 represents one physical storage area that is shared by both A-DASD 206 and B-DASD 207, the shared cache 208 of FIG. 3 is shown in FIG. 4 as divided into A-cache 210 and B-cache 212. Such division is made to better illustrate the logic of the program. There need not, however, be two physical locations identified as A-Cache 210 and B-cache 212; A-cache 210 and B-cache 212 may optionally be logical constructs and represent subsets of the data records actually resident in cache 208.

A-cache 210 is contains all those records in cache 208 that have been received through A-interface 201 or read back from A-DASD 206. B-cache 212 contains the data records which have just been read from B-DASD 206. It is a conventional read-ahead cache.

Records in A-cache are provided with dual "addresses" known to the control program by certain flags, namely "Committed-A" and "Committed-B", respectively. See a description of FIG. 5 for a discussion of the data fields used by a method of the present invention. The control program 209 of the present invention uses "Committed-A" and "Committed-B" record fields to keep track of which updated data records have stored into which storage devices 206, 207.

Data Transfer

With continuing reference to the embodiment of FIG. 2, FIG. 4 shows a block diagram of the transfer of data records as controlled by a method of the present invention. Data records are transferred into or out of the storage subsystem 205 through either the A-interface 201 or B-interface 202 and are buffered in cache 208.

Data Transfer Through the A-Interface 201

More specifically, the A-interface 201 is a virtual device interface that receives data from or writes data to a type of application that is "read and write intensive" which is exemplified by Transaction Processing [TP] 220 applications. This type of application may generate either a read data out or write data in request.

When writing in data through the A-interface 201 as exemplified by the path defined by arrowheads 240 and 245, control program 209 transfers (writes in) data originating from a Transaction Processing application from the A-interface 201 to A-cache 210, where it is temporarily held until written onto the A-DASD 206. When reading out data through the A-interface 201 as exemplified by the path defined by arrowheads 250 and 255, control program 209 reads out data upon a request originating from a Transaction Processing application 220. If the data records are still temporarily resident in the A-cache 210, control program 209 transfers the requested data from there to the A-interface 201. Otherwise, the data is read out from the A-DASD 206 to the A-cache 210 (acting as a read-ahead buffer) and immediately output to the A-interface 201. These kinds of pathways for data transfer are well described in the prior art.

Data Transfer Through the B-Interface 202

The B-interface 202 only receives data from a virtual device interface representing a type of application that is "read intensive," which is exemplified by Decision Support System (DSS) application 230. This type of application primarily generates read out, rather than write, requests.

In responding to a request from a Decision Support System application 230 to read data out, as exemplified by the path defined by arrowheads 260 and 265, the control program 209 transfers data from the B-DASD 207 to the B-cache 212 (acting as a read-ahead buffer) and immediately output to the B-interface 202.

The novelty of the present invention is especially apparent from two constructs in FIG. 4, first, the B-interface 202 and second, the B-cache 212. The B-interface 202 acts as a "read" driver, that is, that set of conventions between the host computer and a Decision Support System application 230 whereby the host computer is told the address of the storage location where the data used by a Decision Support System application are read out from. B-cache 212 is optionally an actual physical memory location within cache 208, or alternatively may be a dynamically configurable portion of cache 208, if so designed. The presence of the B-interface 202 gives the appearance to applications on the one or more host computers that the system contains two storage devices, namely A-interface 201 and B-interface 202.

As exemplified by the path defined by arrowhead 270, a request to write in data from a Decision Support System application 230 (i.e. generally any red-intensive software application) the control program 209 transfers data from the B-interface 202 to the A-interface 206 from which it is transferred by path 240 to A-cache 210, where it is temporarily held until output to both the A-DASD 206 and to the B-DASD 207. This pathway is different from those pathways of data transfer typically performed by a RAID-controller Data records in A-cache 210 are written to the A-DASD 206 opportunistically. Thus, any data transfer to the A-cache 210, whether from the A-interface 201 or B-interface 202 via A-interface 201, will be written to the A-DASD 206 as soon as possible.

Described below is a pathway of data transfer that a method of the present invention performs in an unconventional way inasmuch as the present method governs and permits redundant data storage that is both asynchronous and, for short periods, asymmetrical, and therefore unmirrored, between paired storage devices.

Data Transfer from A-cache to B-DASD

The pathway defined by arrowhead 290 from A-cache 210 to B-DASD 207 represents the function of updating the B-DASD 207 with the changed data records stored in A-cache 210, and thereby represents the "mirroring" of B-DASD 207 relative to A-DASD 206. In the present method, reading out from B-DASD 207 a sequential record takes precedence over updating data records into B-DASD 207. Therefore, if a changed data record is written into A-cache 210 that relates to one of the records currently being sequentially read out from B-DASD 207, the read out of the requested record is not generally interrupted in order to write in updated information. How this translates in terms of how the disk heads are behaving is: if a changed data record is written into A-cache 210, the disk head of B-DASD 207 is generally not directed to move to a position to write in the updated record, unless A-cache 210 is full.

Because requests from Decision Support System Programs 230 for read outs cause control program 209 to operate the disk head of B-DASD 207 so that it reads long data blocks sequentially and then is inactive for relatively long periods (See FIG. 11), updating data records in B-DASD 207 is timed to occur during these anticipated periods of disk head inactivity. By delaying and timing updating to more closely approximate how data requests from Decision Support System applications are most optionally read out by the disk heads of the B-DASD 207, updating of changed data records from the A-cache 210 in accordance with this invention will actually reduce latency of data transfer from the B-interface 202. This is so because the disk heads are generally only repositioned to write in changed data records after an entire sequential data block has been read out.

Thus, key to understanding the present invention is to appreciate that the present method modifies the way that the updating of records in the B-DASD 207 is done from the way that updating is done in a typical RAID-1 array. The aim of the present method in updating records in the B-DASD 207 is to keep changed records stored in A-cache 210 and to keep track of the records in B-DASD 207 needing to be updated, while allowing a long, sequential read out from B-DASD 207 with regularly scheduled interruptions that do not disrupt the read out.

However, depending on the size of the cache as well as on the rate at which data records have been updated, updating the B-DASD 207 from A-cache 210 may become necessary, namely when A-cache 210 is full. Then, updating to the B-DASD 207 must be performed. And actually, updating to the B-DASD 207 may have to be performed fairly frequently when there are relatively continuous requests for read out from the B-interface 202 with few periods of no-activity for the disk head during which to update B-DASD 207 from A-cache 210.

When updating must occur while the disk head is reading out from the B-DASD 207, the control program 209 directs that the disk head write in to B-DASD 207 those data records whose addresses (as identified by certain fields, such as cylinder number 312, head number 314, record number 316; see the description for FIG. 5 below) are located on the disk platters "behind" the disk heads. In other words, during a read operation from the B-interface 202, the control program 209 directs the disk head to write first those data records which will be stored in tracks on the disk platter that lie more towards the outer edge of the platter relative to where the disk head is currently reading from. In this way, the storage in the A-cache 210 can be freed to accommodate incoming data record changes at the same time that the "integrity" of the entire sequence of read out records is preserved. That is, the control program 209 updates the B-DASD 207 in a way that allows the data records accessed from B-DASD 207 to be read out in an entire sequence without updating individual records during read out.

However, there may arise circumstances, such as when the A-cache 210 is being deluged with data records, when the control program 209 is unable to direct that only those data records whose addresses are "behind" the disk heads shall be updated during a read out from the B-interface 202. At those circumstances, the control program 209 would revert to updating the B-DASD 207 without consideration for the addresses of the updated data records, which is consistent with the operation of a RAID-1 engine. Thus, in a worst case scenario when the storage limits of A-cache 210 are being continuously overreached, the result of the method of the present invention devolves into functionally much like a RAID-1 engine. It is important to note that in all other circumstances, the method of the present invention will outperform a RAID-1 engine both in terms of reducing latency in accessing data and in improving throughput.

Figure 5:
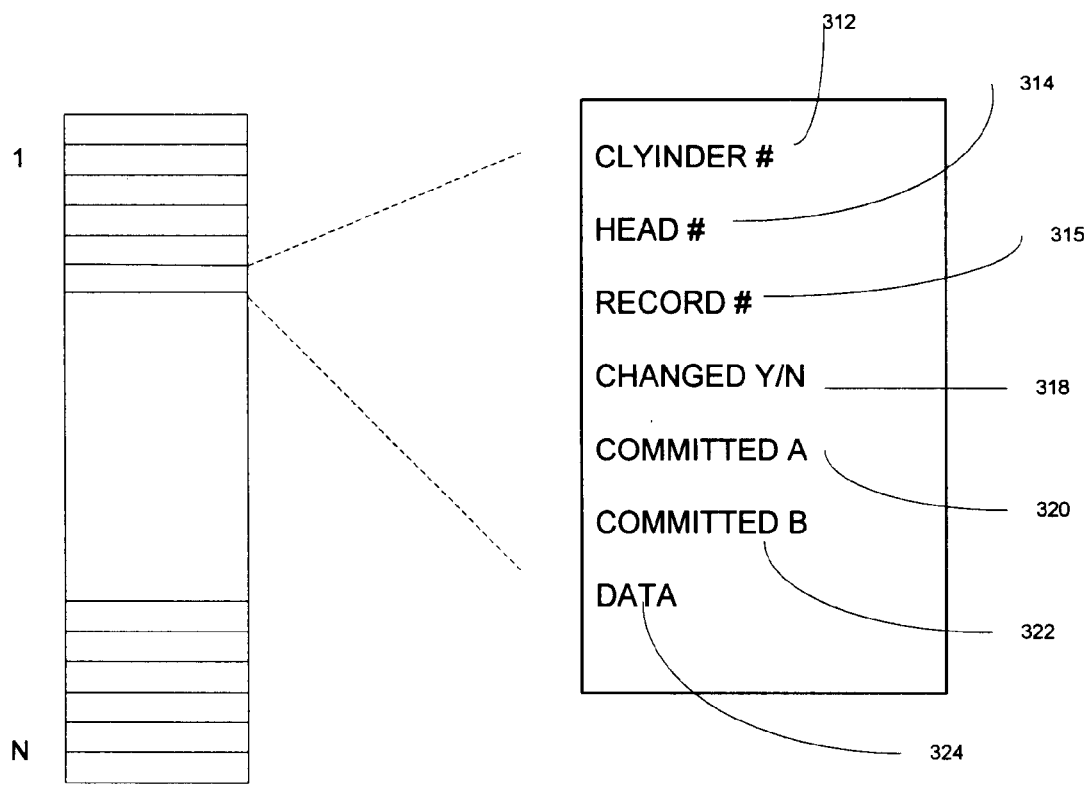
FIG. 5 shows a data record embodiment of the organization of the A-cache of the system of the present invention wherein the storage device subsystem uses a disk drive organized into cylinder/head/record components.

FIG. 5 shows an embodiment of the organization of an A-cache 210 wherein the storage device subsystem uses a disk drive organized into cylinder/head/record components. Shown is a set of N records, each having the field s shown on the right.

Each record in A-cache 210 is organized into six fields followed by the actual data. The field identifiers supply information to the control program 209 whereby the control program 209 can determine to which of the storage devices in the paired set of devices 206, 207 a data record 324 has been written and where on the platter the data record is located. These address fields typically include cylinder number 312, head number 314, record number 316, which together supply an address for the data record on the platter. Of course, other forms of identifying an address may be used, in which case the data structure is modified accordingly. Other fields include a flag, Changed Y/N 318, which indicates whether the have changed due to input via A-interface 201; Committed A 320, a flag which indicates whether the corresponding data has been committed or stored onto A-DASD 206; and, Committed B 322, flagging whether the corresponding data has been committed or stored onto B-DASD 207.

The number of records that may be stored in a cache from 1 to N is limited by the amount of installed memory. In addition, as is well known in the art, other fields besides the above six may be embedded or appended to the data record to direct the transfer of data records into and out of the cache 208 and to direct the storage of data records into A-DASD 206 and B-DASD 207. Thus, at a minimum for the present invention, each data record in cache 208 is described by its location address (cylinder 312, head 314 and record numbers 316), by state of change 318 and where committed 320, 322. These fields 312 to 324 are the tags by which the control program 209 can access directly those data records temporarily stored in cache 208 and make decisions about whether the data records stored in the paired storage devices 206, 207 are actually redundant and mirror each other.

By using these data record fields, the control program 209 of the present invention directs an asymmetric storage between the paired devices 206, 207 and "remembers" what data records still resident in cache 208 have yet to be stored into one of the devices in order to achieve mirroring. In essence, these fields 312–324 are the keys through which the present invention directs signals to each of the paired storage devices 206, 207 to store data records asymmetrically—and therefore not to perfectly mirror each other at all times—in order to accommodate the long, slow read out of Decision Support System data.

Figure 6:
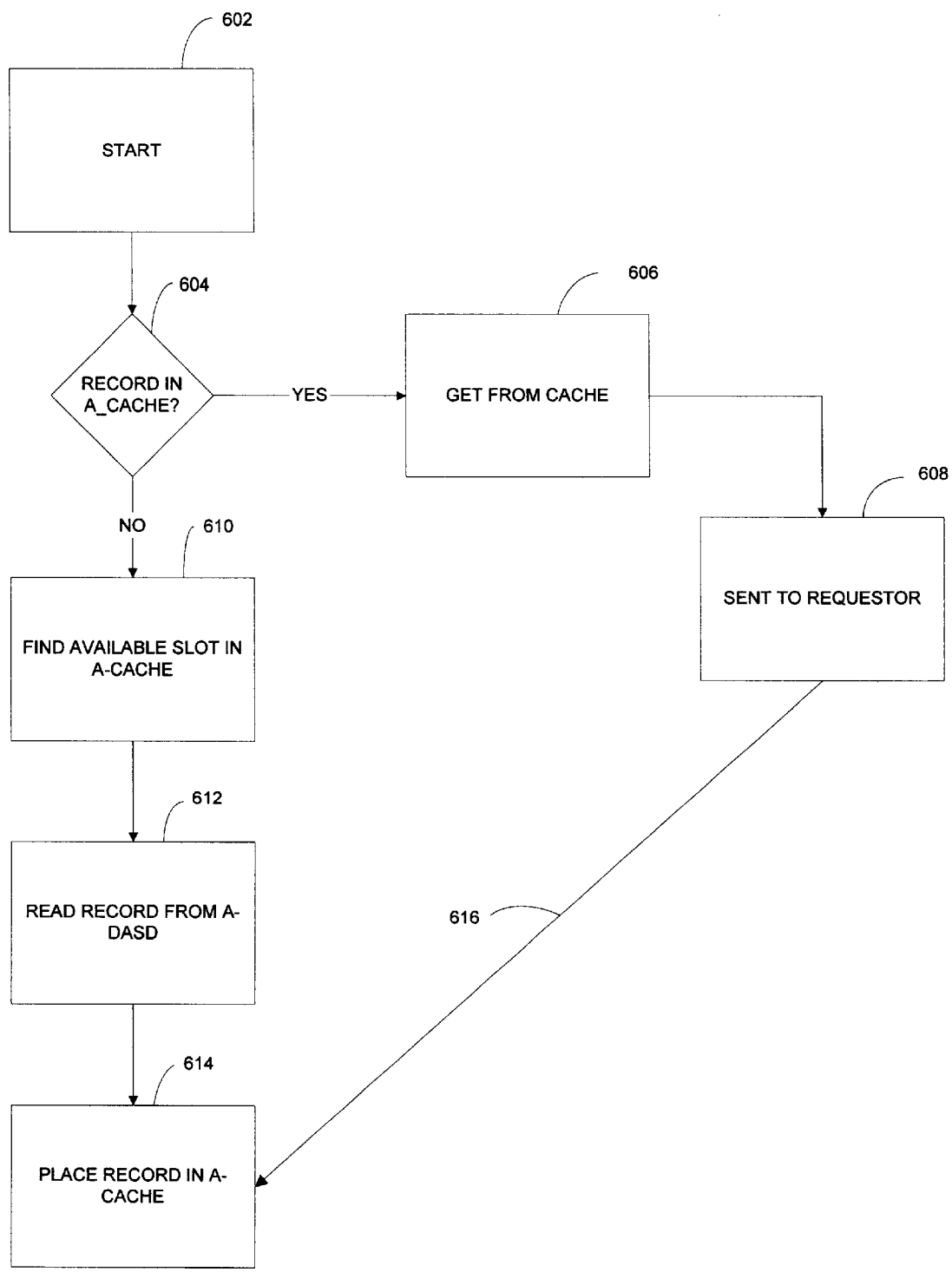
FIG. 6 is a flow chart depicting when a Read Command is sent through the A-interface of a typical RAID-1 engine.
Figure 7:
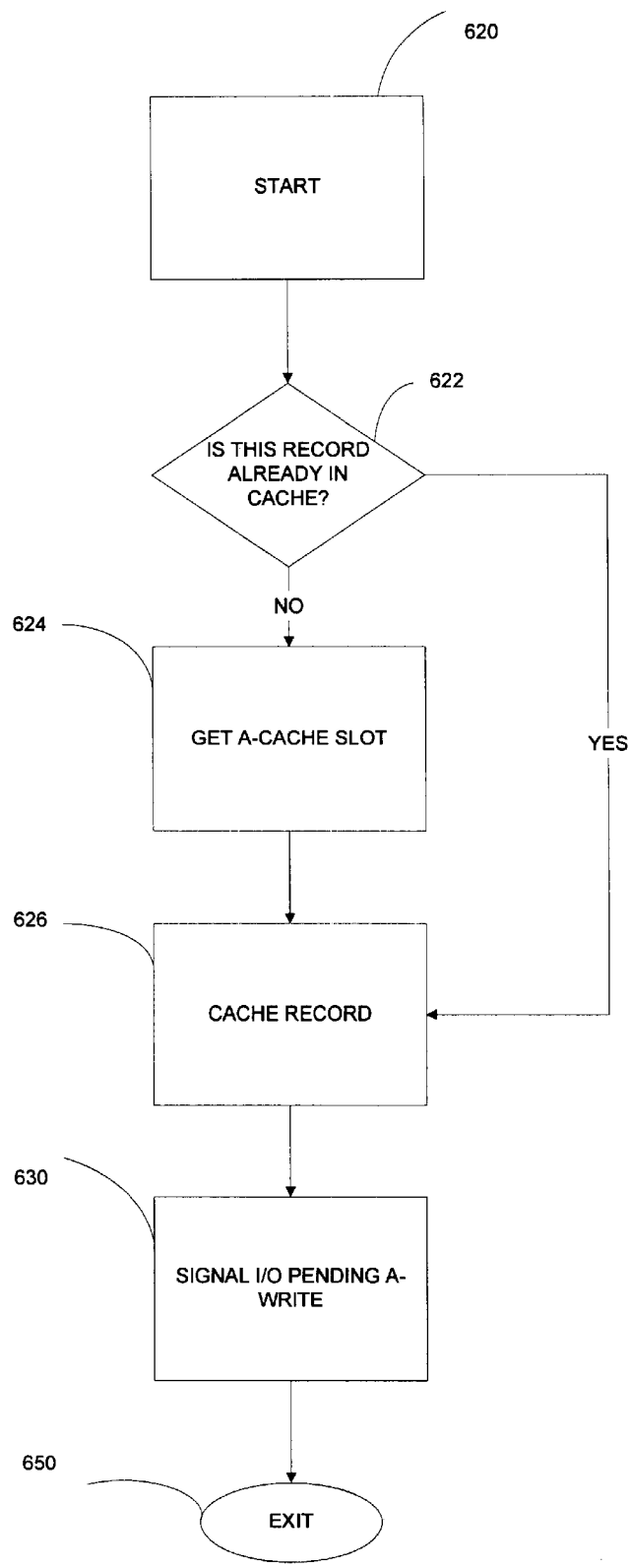
FIG. 7 is a flow chart depicting when a Write Command is sent through the A-interface of a typical RAID-1 engine.

With continuing reference to FIG. 2 and to FIG. 4, FIGS. 6 and 7 are flow charts that depict embodiments of standard, known logic for controlling Input and Output commands adapted to operate in accordance with this invention through an A-interface 201. FIG. 6 depicts a Read Command from A-interface 201. The routine begins at step 602 with a request for a record to be read out from a Transaction Processing application. At 604, the routine queries whether the requested record is already in A-cache 210. If yes, at step 606 the program directs the record to be retrieved from A-cache 210 and at step 608 the record is sent to the requestor and the routine is ended.

If the record is not already in A-cache 210, at step 610 the routine directs that an available slot in A-cache 210 be made available for the stored record. At step 612, the routine directs that the disk head (not shown) of the A-DASD 206 read out the record and at step 614, store it in the available slot in A-cache 210, from which the record is sent to requestor in step 616.

To relate to the data flow chart of FIG. 4, the routine of FIG. 6 is represented by the pathway in FIG. 4 identified by arrowheads 250 and 255.

FIG. 7 depicts embodiments of standard, known logic for controlling a Read Command through A-interface 201. It is important to keep in mind that A-interface 201 is used for all write commands, whether they involve data from a Transaction Processing application 220 or data from a Decision Support System application 230. The routine starts at step 620 when a record is being written to A-DASD 206. At step 622, the routine queries whether the record is already in A-cache 210. If not, at step 624 a slot in the A-cache 210 is made available. This step is more fully described in FIG. 10C. At step 626, the record is placed into A-cache 210. If the record was already in A-cache 210, the routine proceeds to step 630 and signals the control program that updating of the storage devices needs to occur, i.e., that there is a pending write-record command in A-cache 210 to A-DASD 206. The routine then moves through the logic shown in FIG. 8.

To relate to the data flow chart of FIG. 4, the routine of FIG. 7 is represented by the pathway in FIG. 4 identified by arrowheads 240 and 245.

Figure 8:
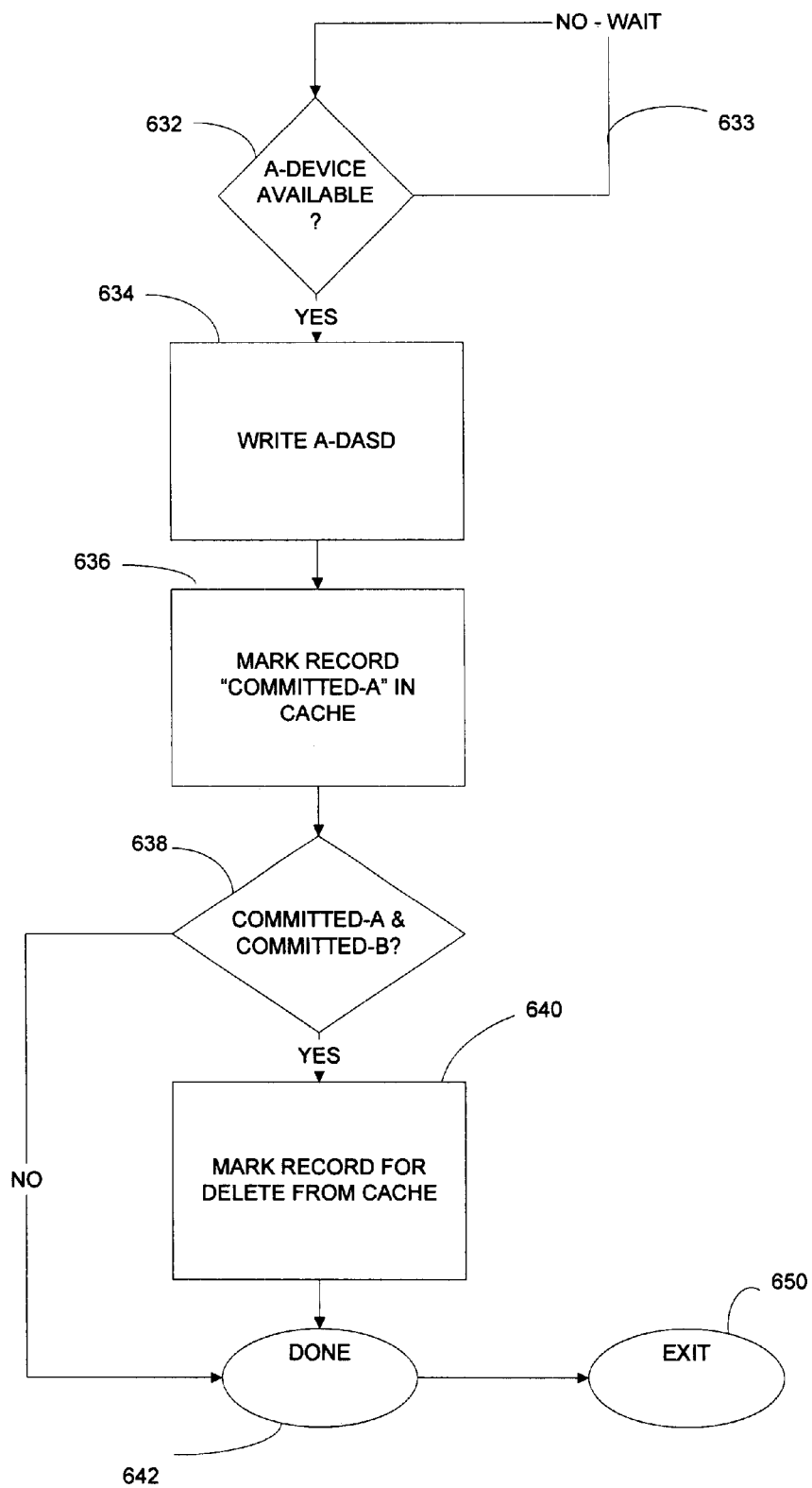
FIG. 8 is a flow chart depicting a method of the present invention for performing the updating step shown in FIG. 7 when a Write Command is sent through the A-interface.

FIG. 8 shows a subroutine for signaling the presence of a pending write record command in A-cache 210 and for executing the update to A-DASD 206. From step 630 shown in FIG. 7, the routine proceeds to step 632 in FIG. 8 where it queries whether A-DASD 206 is available to write in an updated record. In physical terms, this query is determining whether the disk heads of A-DASD 206 are currently occupied with another task.

If the disk heads are not available to write updated records, the routine enters loop 633 until they are available. When they are available, the routine moves to step 634 where the disk heads write the updated records to A-DASD 206. At this point, step 636, the routine marks a field in those updated data records in A-cache 210 as "Committed-A" 320. (See FIG. 5 for a description of record fields). Thus, the presence of a "Committed-A" 320 flag that is YES in a data record simply identifies which records in the A-cache 210 have already been written to A-DASD 206. Since A-DASD 206 is the storage device dedicated to the write-in data channel through A-interface 201, A-DASD 206 is always updated first whenever a write in request is executed.

Up to step 636 in FIG. 8, the logic of the routine is virtually the same as that used in a RAID-1 engine 109 for updating the storage devices. RAID-1 engines 109 do not use a "Committed-A" flag, but rather a more generic "Committed" flag to identify which data records in the cache have been written to both storage devices. In a RAID-1 array, commitment to both storage devices occurs more or less simultaneously, hence the term mirroring used to describe how storage of data is accomplished in a RAID-1 array.

However, starting at step 638, the logic in FIG. 8 deviates from that of a RAID-1 engine and comprises steps unique to a method of the present invention. At step 638, the routine queries whether the data records have been flagged as "Committed-A" 320 and as "Committed-B" 322. Thus, a routine of the present invention also marks an updated data record with a second field entitled "Committed-B" 322. This label informs control program 209 whether the records in A-cache 210 have also been stored in B-DASD 207. In other words, by virtue of this additional record field "Committed-B" 322, a control program of the present invention in effect creates two ledgers, one for identifying which updated data records have been stored in A-DASD 206 and one which identifies whether those data records have also been stored in B-DASD 207.

Key to the present invention is the "bookkeeping" functionality that the extra "Committed-B" 322 flag provides to the control program. By keeping a separate tally of which records have not been committed to B-DASD 207, the control program can lag the writing of updated records to B-DASD 207 relative to the updating of A-DASD 206 to accommodate long, sequential read outs from B-DASD 207. In a nutshell, relying on the "Committed-B" 322 field in data records gives control program 209 of the present invention leeway to stagger the mirroring of B-DASD 207 relative to A-DASD 206 in order to permit a long, sequential read out to occur with minimal interruptions to write in data updates. A typical RAID-1 engine 109 does not use "Committed-B" 322 fields and so cannot stagger the mirroring of the paired storage devices in the RAID-array.

In physical terms, a control program 209 of the present invention uses the "Committed-B" 322 field to keep tally of the disparity of the mirrored records between A-DASD 206 and B-DASD 207. The tally in hand, so to speak, the control program 209 of the present invention can permit the disk head to read out a long, sequential data block in a single, generally continuous movement across the tracks of the platter or with a minimum of efficiently planned interruptions to write out updated data records. Having the disk head of B-DASD 207 read a long block of sequential data records with no or efficiently ordered interruptions increases throughput in predictable and calculable ways, as compared with that of a RAID-1 engine. FIGS. 10C and 10D illustrate how a control program 209 of the present invention efficiently orders the interruptions to write updated data during a read out of sequential data.

In terms of the data flow chart shown in FIG. 4, the routine of FIG. 8 represents that pathway from A-cache 210 to B-DASD 207 indicated by arrowhead 290 and which may be labeled the updating step of B-DASD 207.

Figure 9:
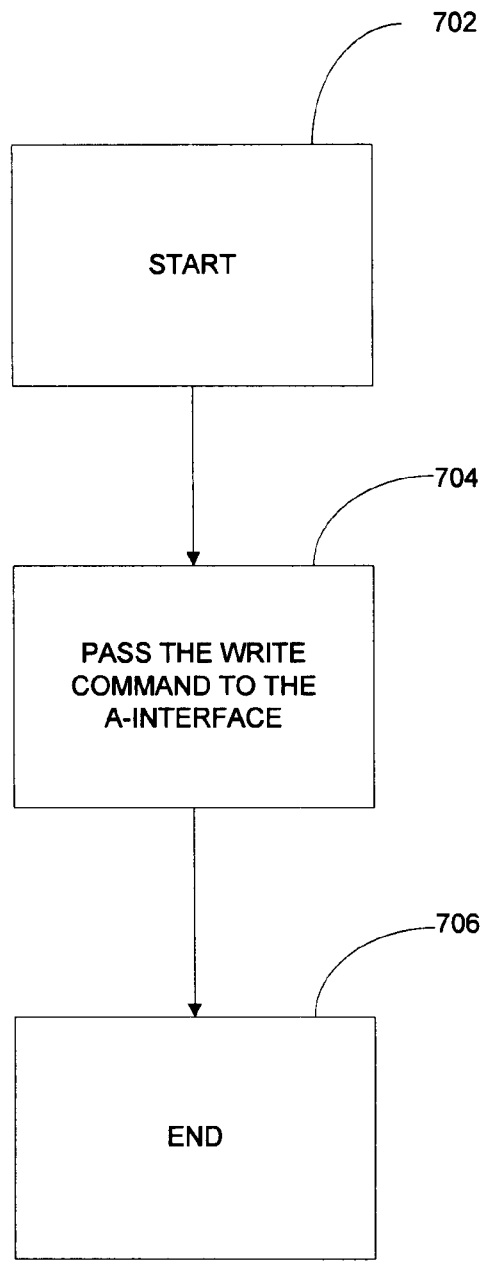
FIG. 9 is a flow chart depicting the steps of a method of the present invention when a Write Command is sent through the B-interface.

FIG. 9 illustrates the steps of a routine of the present invention when a Write Command is sent through B-interface 202. As discussed above, this is a relatively unusual event since Decision Support System applications 220 typically perform data mining, number-crunching, and report-creation and do not, for example, fill customer orders or record point of sale purchases or ATM transactions.

The routine starts at step 702 when the control program 209 receives a request to write updated records from the B-interface 202. At step 704, the control program 209 routes the request to A-interface 201. The updated data records flow through the data pathway identified in FIG. 4 by arrowheads 240 and 245 and the request is executed as discussed above in FIG. 7. At step 706, the routine ends.

FIG. 9 illustrates that all writes to the paired storage arrays are channeled through A-interface 201 and that the present method handles them as if initiated from a Transaction Processing application 220. Relating the data flow chart of FIG. 4, the routine of FIG. 9 represents the pathway identified by arrowheads 270, 240 and 245.

FIGS. 10A–D together comprise the logic and illustrate the steps of a method of the present invention when a Read Command is sent through the B-interface 202. To relate to the data flow chart in FIG. 4, FIGS. 10A–D individually represent different scenarios for transferring stored data records through the pathway identified by arrowheads 260 and 265.

Figure 10A:
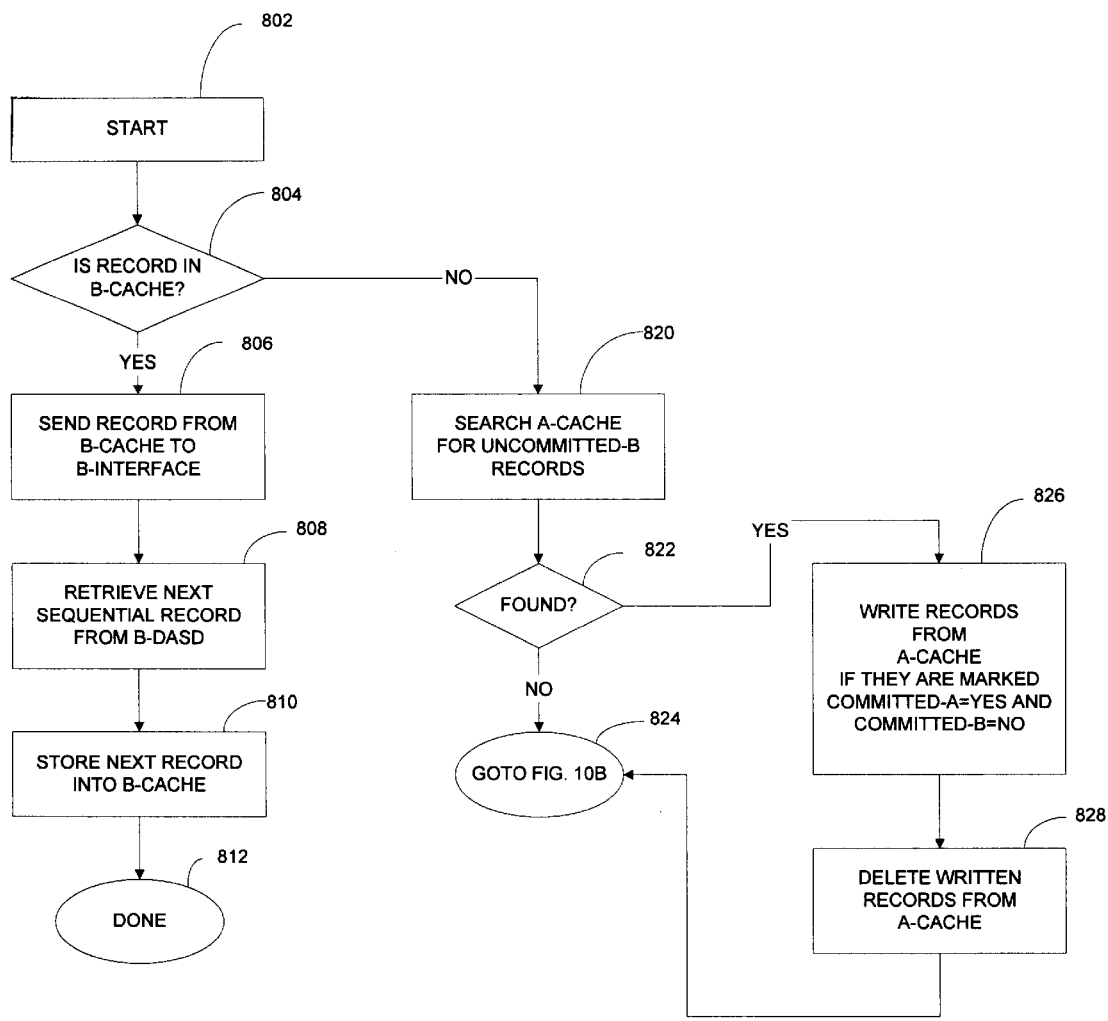
FIG. 10A is a flow chart depicting the steps of a method of the present for the overall routine of operations when a Read Command is sent through the B-interface.

FIG. 10A illustrates the steps of the overall routine of operations when a Read Command is sent through B-interface 202. Also, in steps 802–812, FIG. 10A more specifically depicts the transfer of data records from B-DASD 207, given the conditions that A-cache 210 is not full and that all the requested records are not being updated during the read out. The subroutine of steps 802 through 812 represents, then, a highly efficient execution scenario for how a control program 209 of the present invention operates to improve throughput and reduce latency relative to a typical RAID-1 engine.

The subroutine starts at step 802 with a request through B-interface 202. This means that the request originates from a Decision Support System application 230 and involves a relatively long read out of a large number of data records by the disk heads of B-DASD 207 in a more or less sequential fashion. During a sequential read, the disk heads move across the platter in a "forward" direction: that is, the disk heads start reading records located more towards the outside edges of the platter and move in an inward spiraling fashion to read records located more towards the center of the platter.

The 802–812 subroutine proceeds to step 804 at which the control program queries whether the data records to be read out are in B-cache 212. As discussed above, B-cache 212 may be a logical construct and does not necessarily comprise a separate set of physical memory locations apart from cache 208.

If the data record is identified as being in B-cache 212 and thus already committed to B-DASD 207, then at step 806 the control program transfers the data record through the data channel of B-interface 202. At step 808, the next sequential record from B-DASD 207 is retrieved, meaning that the disk heads move to the next record in the track as they move "forwards" in a spiral motion from tracks toward the outside of the platter towards the platter center. At step 810, that record is stored in B-cache 212, a typical look ahead buffer function. The routine continues querying and labeling each sequential record as the disk head moves "forward" and sending them through B-interface 202 until all the records in a data block have been read out.

As subroutine 802 through 812 shows, the first of the requested data records in the sequential read request were already in the B-cache 212 and were not called to be updated during the read out of the requested data block. In this scenario, as the disk heads move forward to read out the sequence of all records, all the data records "behind" the disk heads--that is, between the disk heads and the outer edges of the platters--represent available sectors on the platter to be rewritten. For example, if the read out request requires transfer of sequence of records located on an entire or nearly an entire platter, the disk heads, upon completion of the read out, are suitably positioned to most efficiently begin writing updated data records from A-interface 201 as they move in the reverse direction from the center towards the outer edges of the platters.

Creating a ledger of data records in A-cache 210 and determining their status as to whether they have already been committed to B-DASD 207 is critical to allowing a control program of the present invention to stagger the mirroring of A-DASD 206 and B-DASD 207 in a RAID-1 configuration. Without such a ledger, the staggering of the mirroring operation in a RAID-1 configuration cannot be done and the mirroring operation reverts to that which a typical RAID-1 engine directs. The method of the present invention improves the rate of data transfer or throughput in a predictable and calculable manner. Such calculations well known to those skilled in the art.

Returning to step 804 in FIG. 10A, when the requested record is not found in B-cache 212, this condition indicates to the control program that the requested record will have to be read out of sequence and that the control program must reposition the disk heads to skip some record slots on the track. At step 820 the control program directs A-cache 210 to be searched for the record. At step 822, if the record is found in A-cache 210, at steps 826-828 the control program directs that the record be written to B-DASD 207 and then deleted from A-cache 210. At step 824, the routine then executes the subroutine depicted in FIG. 10B.

Figure 10B:
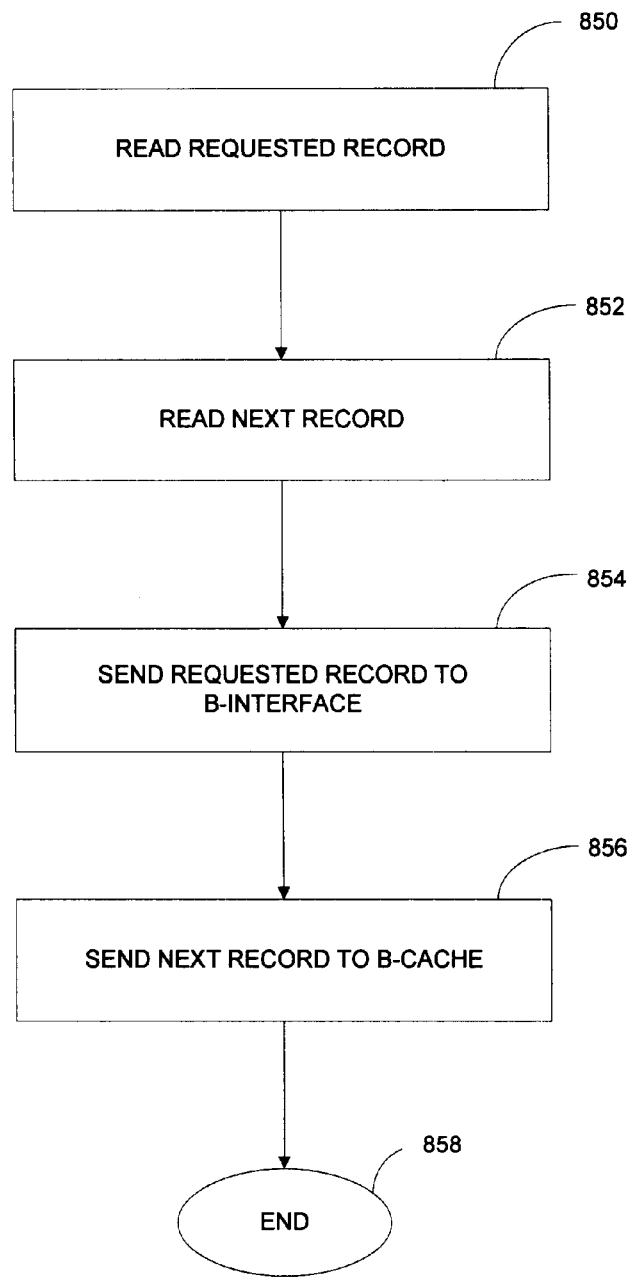
FIG. 10B is a flow chart depicting a subroutine for controlling operations when a non-sequential read request occurs and the A-cache is not full.
Figure 10C:
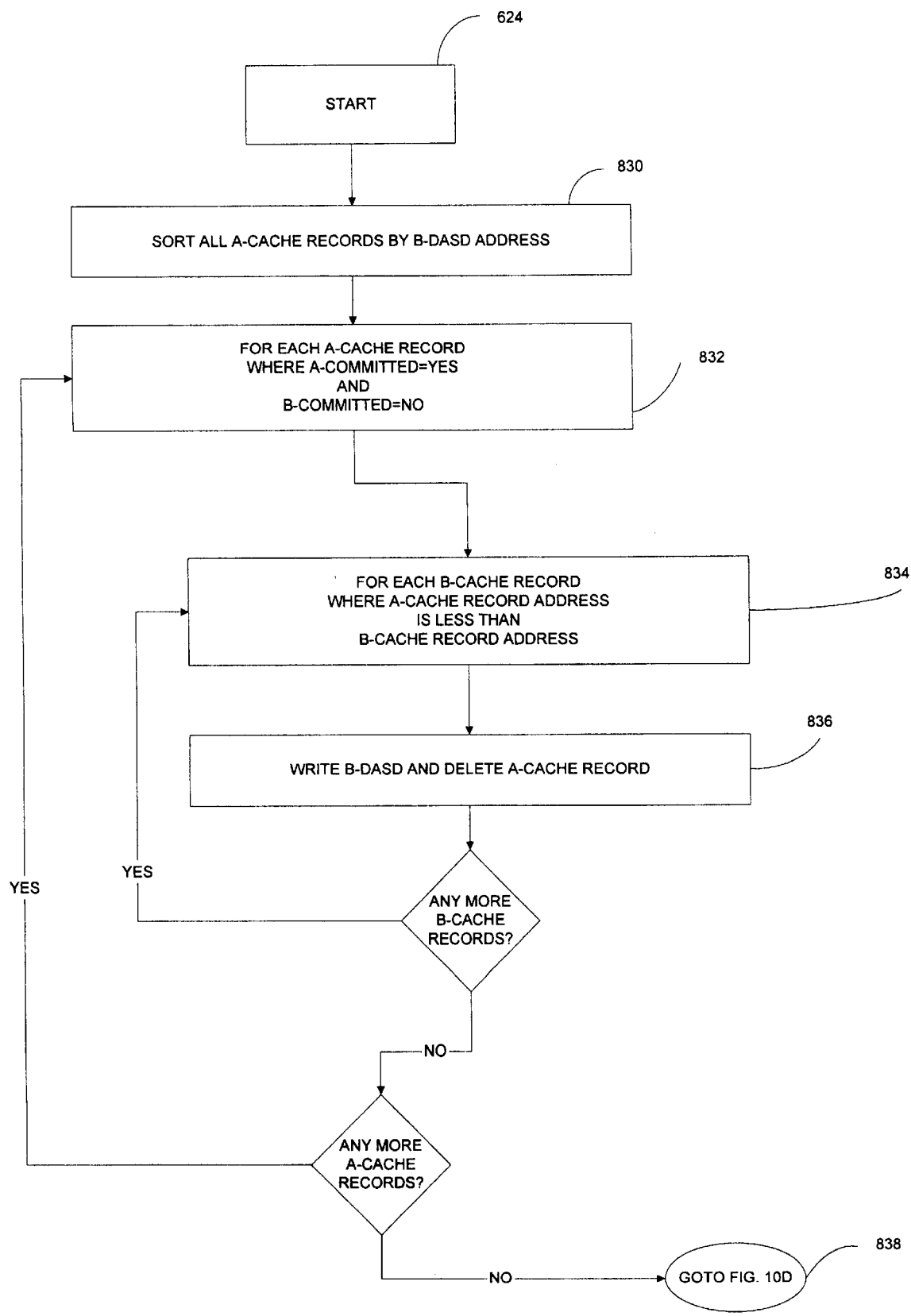
FIG. 10C is a flow chart depicting a routine for controlling operations when a sequential read request occurs, the A-cache is full and an updated data record can be written "behind" the disk head.
Figure 10D:
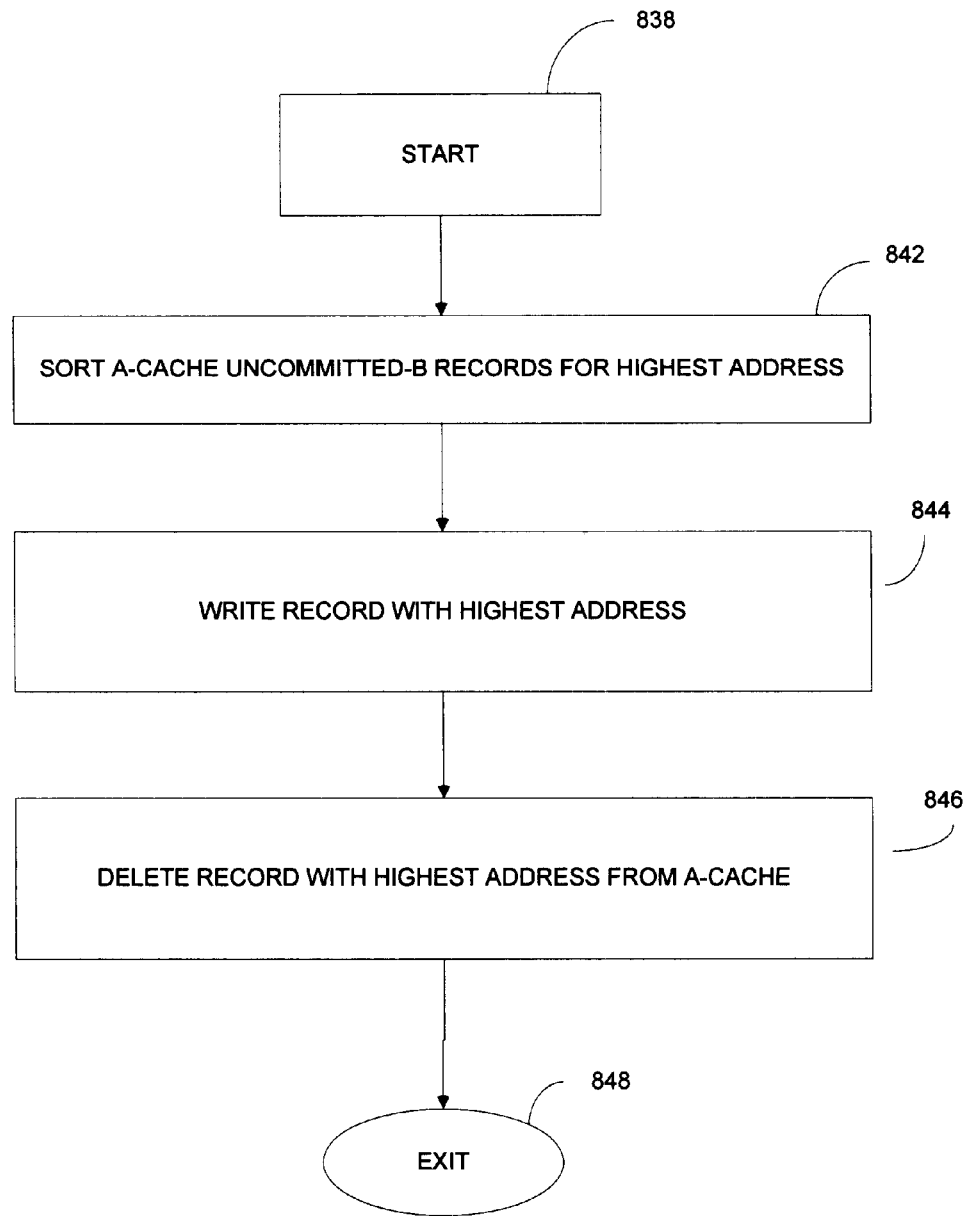
FIG. 10D is a flow chart depicting a routine for controlling operations when a sequential read request is made, the A-cache is full and an updated data record cannot be written "behind" the disk head.

If at step 822, the requested record is not found in the A-cache 210, at 824 the routine executes the subroutine depicted in FIG. 10B.

FIG. 10B illustrates the read out subroutine through B-interface 202 when a non-sequential read request occurs and A-cache 210 contains only "Committed-B" records. At step 850 in FIG. 10B, the control program directs the disk heads to skip sectors and to read a requested record that is not directly adjacent to the previously read record. At step 852, the control program directs the disk heads to read the anticipated next sequential record. At step 854 the first record is sent out through B-interface 202. At step 856, the control program sends the next anticipated sequential records to B-cache 212. At step 856, the subroutine ends, inasmuch as data transfer of sequentially read records has again been achieved, and the routine reverts to the most efficient read out scenario depicted in subroutine 802–812 of FIG. 10A described above.

FIG. 10C depicts the logic of the present method for controlling operations when a sequential read request occurs, in the condition wherein A-cache 210 is full and a request to write an updated data record arrives through A-interface 201. In essence, FIG. 10C illustrates how the present method interrupts the long, sequential read out to direct the disk head to write the updated data record in a sector directly "behind" that sector where the disk head was just reading. In this way, a method of the present invention co-ordinates interruptions of a long, sequential read out so that the "backwards" movement of the disk heads to write in updated data is efficient. The coordinated "backwards" movement of the disk heads to write in new data as required during a long read allows the read out to resume in a very short time, thereby improving throughput of the data transfer.

As discussed above for FIG. 7, step 624 represents the subroutine of freeing up memory slots in A-cache 210 when the A-cache is full and is the start of the subroutine depicted in FIG. 10C. During a long, sequential read, the control program will interrupt the read out of the disk heads when A-cache 210 contains no records that are tagged with both "Committed-A" 320 and "Committed-B" 322 fields. This means that at step 624 in FIG. 10C, the A-cache contains no data records that have been written into B-DASD 207. In order to be able to free up memory slots in A-cache 210, the disk heads must write some uncommitted records to B-DASD 207. In essence, then FIG. 10C represents a situation when a long, sequential read must be interrupted in order to perform required "mirroring" on to B-DASD 207.

At step 830, the control program sorts all the records resident in the A-cache by the address where each of those records will be written to B-DASD 207. As discussed in reference to FIG. 5, the address consists of cylinder number 312, head number 314, and record number 316. At steps 832–836, the control program updates B-DASD 207 by directing the disk heads to write those records whose address is less than the address of the last record that the disk heads just read out. In other words, the control program is directing the disk heads to write into B-DASD 207 those uncommitted records whose address is between the current location of the disk heads and the edge of the platters. At step 836, the records written out to B-DASD 207 are marked as "Committed-B" 322 in A-cache 210 and become available memory slots in A-cache 210.

Sometimes, however, during the sort-and-write operation of steps 832–836, a the control program identifies that there are too few records with addresses "behind" the disk heads, which, when written to, will allow enough memory slots in A-cache 210 to be freed so that all of the incoming write requests from A-interface 201 can be cached. In that situation, control program 209 directs the disk head to write in records to B-DASD 207 at addresses that are "forward" of the current platter position of the disk head.

FIG. 10D illustrates how that "forward" writing is accomplished. FIG. 10D illustrates the steps the control program 209 executes when a sequential read request is made, A-cache 210 is full and an updated data record cannot be written "behind" the disk head. At step 838, when the control program 209 has identified that no records in A-cache 210 contain the "Committed-B" 322 field, the control program starts executing the subroutine. At step 842, the control program sorts all records in A-cache 210 that do not contain a "Committed-B" 322 field for the one with the highest address. A data record possessing the highest address is that data record that lies most "forward" of the disk heads' position on the platter, that is, the record most distant from the disk heads in the direction of the center of the platter. At step 844, the control program directs the disk heads to write in the record with the highest address. At 846, that data record in A-cache is marked as "Committed-B" 322, becomes eligible to be written over (i.e. is logically "deleted") and thereby frees up memory in A-cache.

FIG. 10D illustrates how the method of the present invention operates to preserve data integrity and thereby maximizes overall efficiency while using Decision Support System application. During a long, sequential read out from-B-DASD 207, A-cache 210 can become full and the system is being inundated with so many write in requests to the A-cache 210 that the control program 209 cannot restrain the disk head to write to B-DASD 207 updated records only on sectors "behind" the heads. What makes this situation far from optimal is that in order for records from A-cache 210, to become eligible for deletion the read out from B-DASD 207 will have to be interrupted in order to write in updated records from A-cache 210. However, once the disk head returns to reading out the long, sequential data block, the strong likelihood exists that updated records will now be included in the resumed read out, which will result in the reporting of data of reduced integrity and significance and may actually result in an unusable data report. An example of such would be a statistical analysis that inappropriately relied on data from an earlier and a later time period to make predictions about the behavior of financial parameters based on behavior during an earlier period.

To minimize the likelihood of such loss of data integrity in the event of a relatively large and continuous number of write requests, the control program 209 of the present invention desirably re-positions the disk head as far away as possible from those next records to be sequentially read upon resumption of the read out, so as to reduce the total number of updated records that the disk head will have to read.

Figure 11:
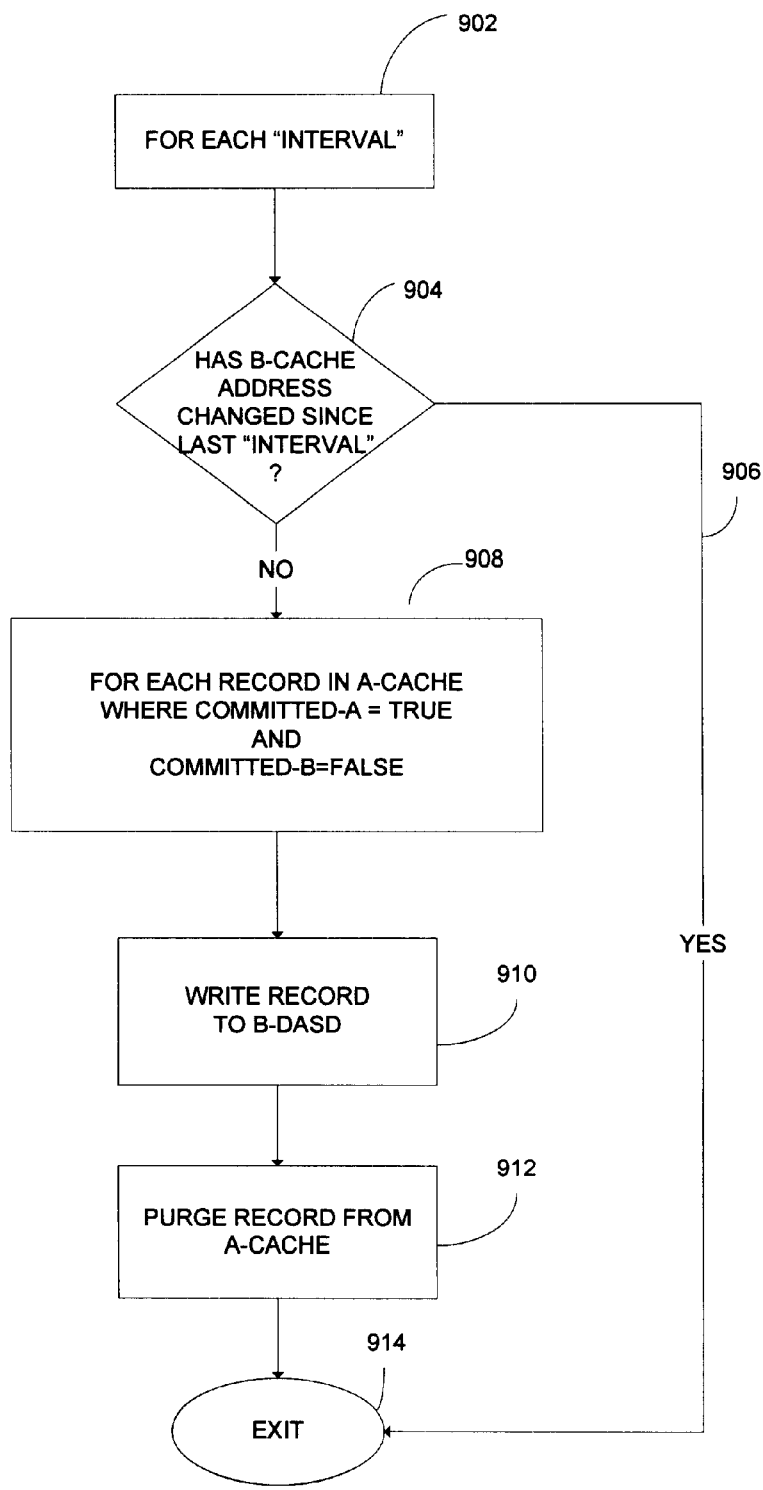
FIG. 11 is a flow chart of how a controller of the present invention schedules the mirroring of the pairwise-redundant direct access storage devices, A-DASD and B-DASD.

FIG. 11 illustrates the logic behind how a controller of the present invention schedules the "mirroring" of the pairwise-redundant direct access storage devices, A-DASD and B-DASD. Block 902 represents that at the end of a predetermined and programmed interval of time during which a sequential read out is occurring as discussed and illustrated especially in FIGS. 10A and B, the control program schedules a regular updating of B-DASD 207. That is to say, the control program schedules regular interruptions of a long, sequential read out in order to insure that the paired storage devices retain redundancy of stored data records. It is by this scheduling routine that a system of the present invention preserves a RAID-1 configuration at the same time that a method of the present provides a marked improvement in throughput and reduction in latency over a typical RAID-1 engine.

At step 904, at the end of the parameterized interval, the control program queries whether the address of the last record read out from B-cache has changed since the previous interval. If yes, the controller assumes that the long read out has not ended and exits the subroutine at step 906 to allow the long read to continue. If, however, the address of the last record read out from B-cache has not changed from the last interval, one of two events can have occurred: either the read out has ended or the read is proceeding more slowly than the interval times. In either event, the controller interprets the situation as if the long, sequential read has ended and begins updating B-DASD 207 in steps 908 & 910 and at steps 912 marks the updated record as an available memory slot in cache-A. At step 914 the controller exits the subroutine to allow a long, sequential read to begin again.

Although the present invention has been exemplified with respect to a preferred embodiment, those skilled in the art will appreciate that variations may be made within the scope of the present invention. For example, although the terms Transaction Processing application and Decision Support System application have been used for conciseness, it is to be understood that in their narrow sense, these two categories of programs are merely illustrative of programs that on the one hand, have short and relatively random read and write requests, and on the other hand, have long and relatively sustained read requests. Moreover, although the terms "applications" are used to describe them, it is to be appreciated that the present invention contemplates operation of the present invention with a single software program that sends staccato read and write requests of data to a first address and sends long sequential reads of substantially the same data to a second address. Moreover a program generated to be aware of an optimized storage device of the present invention is also part of the present invention.

I claim:

1. A method of accessing and storing data in a memory system communicating with one or more computers generating read and write requests, the memory system comprising a controller, a memory cache for temporarily storing data, said memory cache comprising an A-cache and a B-cache, and a pairwise-redundant direct access storage device comprising an A-DASD and a B-DASD, the B-cache being a read-ahead cache of data read from B-DASD, the method comprising the steps of:

a) providing an A-interface and a B-interface to said memory system;

b) configuring transaction processing applications on a computer communicating with said memory system to direct read and write requests to the A-interface;

c) configuring decision support system applications on a computer communicating with said memory system to direct read and write requests to the B-interface;

d) fulfilling write requests received at the A-interface by writing data to the A-cache;

e); fulfilling write requests received at the B-interface by writing data to the A-cache;

f) fulfilling read requests received at the A-interface by reading data from the A-cache whenever it contains the requested data, else from the A-DASD;

g) fulfilling read requests received at the B-interface by reading data from the B-cache whenever it contains the requested data, else from the B-DASD;

h) writing data that has not yet been committed to A-DASD, from the A-cache to the A-DASD whenever the A-DASD is not fulfilling a read request; and i) writing data that has not yet been committed to B-DASD, from the A-cache to the B-DASD whenever the B-DASD is not fulfilling a read request;

j) whenever A-cache becomes full, interrupting the flow of data at A-interface and B-interface, including any read operation from B-DASD; and k) writing to B-DASD records in A-cache that are changed but not yet committed to B-DASD, in the preferential sequence of:

i) those records which are logically in read sequence before the current reading position of B-DASD, and then, if additional records must be written in order to generate sufficient space in A-cache, ii) those records which are logically in read sequence after the reading position of B-DASD and are most distant from the current reading position of B-DASD; such that space in A-cache has been freed; and then l) allowing the flow of data at A-interface and B-interface to resume, including any interrupted read operation from B-DASD, whereby the average time for fulfilling read requests is improved over that of a corresponding memory system using a RAID-1 controller, and the likelihood is minimized that the data read fromB-DASD in a resumed read operation was changed from the corresponding data before the write operation k) was performed.

2. The method of claim 1, wherein:

said A-cache contains records in a memory cache generated from input from A-interface and the records that have been read from A-DASD and wherein said B-cache contains records in a memory cache that have been read from B-DASD.

3. In a memory system communicating with one or more computers generating read and write requests, the memory system comprising a controller, a memory cache for temporarily storing data, and a mirroring direct access storage device comprising an A-DASD and a B-DASD, the improvement comprising:

a) an A-interface adapted for receiving read and write requests generate by transaction processing software running on a computer;

b) a B-interface adapted for receiving read and write requests generated by decision support software running on a computer, the B-interface being configured to send write requests to the A-interface;

c) an A-cache, to which is sent all read and write requests received by the A-interface;

d) a B-cache, to which is sent all read requests received by the B-interface; and e) a controller programmed to cause changed contents of the A-cache to be written to the A-DASD when the A-DASD is not being read from and to be written to the B-DASD when the B-DASD is not being read from, wherein the controller is also programmed to interrupt the flow of data from the A-interface and write to the B-DASD when the A-cache is full, whereby the average time for fulfilling read requests is improved over that of a corresponding memory system using a RAID-1 controller.

4. The memory system of claim 3, wherein the controller is programmed to write to the B-DASD in a sequence that minimizes the likelihood that an interrupted long sequential read being performed on B-DASD will, when resumed, read data that was changed during the write that was programmed as aforesaid.

5. An improved RAID-1 controller for an A-DASD and a B-DASD, further comprising programming resident in the memory of said controller, said programming providing for:

an A-interface and a B-interface at which read and write requests are received and executed;

directing write requests received at the B-interface to the A-interface;

operating an A-cache that receives data from the A-interface which is requested to be written to storage and causes data to be written immediately to the A-DASD when not otherwise occupied and, to the extent permitted by the availability of cache memory, avoids writing to the B-DASD until completion of a long sequential read therefrom, wherein flow of data at A-interface and B-interface is allowed to resume, including any interrupted read operation from B-DASD, whereby the A-interface is optimized to process read and write requests for shorter blocks of data and the B-interface is optimized to process read requests for relatively longer blocks of data, wherein the controller is also programmed to interrupt the flow of data from the A-interface and write to the B-DASD when the A-cache is full.

6. The RAID-1 controller of claim 5, wherein said controller operates the A-cache so as to comprise a plurality of records which indicate whether or not the data in each such record has been committed to A-DASD and whether or not the data in each such record has been committed to B-DASD.

7. A computer system having a data storage system with improved throughput, wherein a read request from decision support application software generally accesses a long sequence of data blocks and a read or write request from transaction processing application software generally accesses non-sequentially read or written data blocks; the system comprising:

(a) a host computer; and (b) a storage subsystem to which data blocks are transferred to and from the host computer;

the storage subsystem comprising:

(i) a storage device, (ii) a memory cache for temporarily storing data blocks being transferred between the host computer and the storage device, and (iii) a pairwise-redundant disk configuration of the storage device whereby said configuration provides for creating a redundant pair of data sets;

and wherein industry-standard protocols are used for interfacing the storage subsystem with the host computer; and (iv) a controller for the storage device that:

(1) configures the storage device whereby a data block is stored twice, into a first and a second of a pair of storage sets for the purpose of storing data in a pairwise-redundant manner;

(2) stores data from non-sequentially written data blocks into the first storage set while and as responding to a processing command from a decision support system software to read out sequentially-read data blocks;

(3) stores data from non-sequentially written data blocks into the memory cache while and as responding to a read command from the decision support system software to read out sequentially-read data blocks, so long as the storage capacity of the memory cache has not been reached;

(4) so long as the storage capacity of the memory cache has not been reached, transfers said set of data blocks stored therein into the second storage set upon completion of processing a read request from decision support system software to read out sequentially-read data blocks; and (5) when the storage capacity of the memory cache has been reached, interrupts the processing of a read request from decision support system application software to read out sequentially-read data blocks by transferring said set of data blocks stored in cache memory into the second storage set, wherein the storage device controller uses industry standard protocols.

8. The system of claim 7 wherein the storage device controller uses industry standard protocols comprising Fibre Channel standards.

9. The system of claim 7, wherein the storage device controller uses industry standard protocols comprising SCSI standards.

10. The system of claim 7, wherein the storage device controller uses industry standard protocols comprising IDE/ATA standards.

11. The system of claim 7 wherein the storage device controller uses industry standard protocols comprising PCI standards.

12. The system of claim 7, wherein the storage subsystem comprises a plurality of storage devices and wherein the storage device controller further:

a) configures an even number of storage devices so that there are discrete pairs of storage devices whereon the same sets of data blocks are stored twice, as a first storage set and a second storage set in a pair, creating pairwise-redundant sets of data;

b) stores a set of non-sequentially written data blocks into the first storage set while and as responding to a processing command from decision support system application software to read out sequentially-read data blocks;

c) so long as cache memory has not been exceeded, transfers said set of data blocks stored therein into the second storage device upon completion of processing a request from decision support system application software to read out sequentially read data blocks;

d) when cache memory is full, interrupts the processing of a request from decision support system application software to read out sequentially-read data blocks by transferring said set of data blocks from cache memory into the second storage device.

13. The system of claim 12, wherein the storage devices comprise at least one pair of RAID disk drives.

14. The system of claim 12, wherein the storage devices comprise a pair of storage devices within a storage area network.

15. The system of claim 12, wherein the storage devices comprise a pair of CD-DOMs.

16. The system of claim 12, wherein a storage device controller uses industry standard protocols comprising Fibre Channel standards.

17. The system of claim 12, wherein a storage device controller uses industry standard protocols comprising SCSI standards.

18. The system of claim 12, wherein a storage device controller uses industry standard protocols comprising IDE/ATA standards.

19. The system of claim 12, wherein a storage device controller uses industry standard protocols comprising PCI standards.

20. The system of claim 12, wherein a storage device controller uses industry standard protocols comprising Internet Protocol standards.

21. A machine readable medium containing executable code, wherein the read-write throughput of a programmed general purpose computer comprising the memory system of claim 6 is optimized by the presence of code which directs write requests and non-sequential read requests to the A-interface and which directs sequential read requests to the B-interface.

* * * * *